(12) United States Patent
Damgaard et al.

(10) Patent No.: US 7,577,250 B2
(45) Date of Patent: Aug. 18, 2009

(54) KEY DERIVATION FUNCTIONS TO ENHANCE SECURITY

(75) Inventors: Ivan Bjerre Damgaard, Aabyhoej (DK); Torben Pryds Pedersen, Aabyhoej (DK); Vincent Rijmen, Graz (AT)

(73) Assignee: CMLA, LLC, Hillsboro, OR (US)

( * ) Notice: Subject to any disclaimer, the term of this patent is extended or adjusted under 35 U.S.C. 154(b) by 765 days.

(21) Appl. No.: 10/918,718

(22) Filed: Aug. 12, 2004

(65) Prior Publication Data

US 2006/0034457 A1    Feb. 16, 2006

(51) Int. Cl.
*H04L 9/00* (2006.01)
(52) U.S. Cl. .......................... 380/44; 380/277
(58) Field of Classification Search .......... None
See application file for complete search history.

(56) References Cited

U.S. PATENT DOCUMENTS

| | | | |
|---|---|---|---|
| 4,310,720 A | 1/1982 | Check, Jr. | |
| 4,841,570 A | 6/1989 | Cooper | |
| 5,003,596 A | 3/1991 | Wood | |
| 5,123,045 A | 6/1992 | Ostrovsky et al. | |
| 5,481,613 A | 1/1996 | Ford et al. | |
| 5,608,801 A * | 3/1997 | Aiello et al. | 380/46 |
| 5,699,431 A | 12/1997 | Van Oorschot et al. | |
| 5,796,839 A | 8/1998 | Ishiguro | |
| 5,799,088 A | 8/1998 | Raike | |
| 5,838,795 A | 11/1998 | Mittenthal | |
| 5,949,884 A * | 9/1999 | Adams et al. | 380/29 |
| 5,995,624 A | 11/1999 | Fielder | 380/25 |
| 6,012,160 A | 1/2000 | Dent | |
| 6,049,612 A | 4/2000 | Fielder et al. | 380/44 |
| 6,125,182 A | 9/2000 | Satterfield | 380/28 |
| 6,226,629 B1 * | 5/2001 | Cossock | 707/3 |
| 6,275,936 B1 | 8/2001 | Kyojima et al. | |
| 6,304,890 B1 | 10/2001 | Miyasaka et al. | |
| 6,363,407 B1 | 3/2002 | Miyasaka et al. | |
| 6,567,914 B1 | 5/2003 | Just et al. | |
| 6,609,223 B1 | 8/2003 | Wolfgang | |
| 6,633,244 B2 | 10/2003 | Avery et al. | |

(Continued)

FOREIGN PATENT DOCUMENTS

CA    2293684    10/1998

(Continued)

OTHER PUBLICATIONS

Maurer and Massey, "Perfect Local Randomness in Pseudo-random Sequences," *Advances in Cryptology—CRYPTO '89*, LNCS 435, pp. 100-112 (1990).

(Continued)

*Primary Examiner*—Pramila Parthasarathy
(74) *Attorney, Agent, or Firm*—Marger Johnson & McCollom PC

(57) ABSTRACT

Key derivation algorithms are disclosed. In one key derivation application, a segment of the master key is hashed. Two numbers of derived from another segment of the master key. A universal hash function, using the two numbers, is applied to the result of the hash, from which bits are selected as the derived key. In another embodiment, an encoded counter is combined with segments of the master key. The result is then hashed, from which bits are selected as the derived key.

69 Claims, 19 Drawing Sheets

U.S. PATENT DOCUMENTS

| | | | |
|---|---|---|---|
| 6,891,950 | B1 | 5/2005 | Oomori et al. |
| 7,236,592 | B2 | 6/2007 | Coppersmith et al. |
| 7,447,233 | B2 | 11/2008 | Narad et al. |
| 2001/0031050 | A1 | 10/2001 | Domstedt et al. |
| 2001/0038347 | A1 | 11/2001 | Avery et al. |
| 2002/0027987 | A1 | 3/2002 | Roelse |
| 2002/0051534 | A1 | 5/2002 | Matchett et al. |
| 2002/0078011 | A1 | 6/2002 | Lee et al. |
| 2002/0118827 | A1 | 8/2002 | Luyster |
| 2003/0081785 | A1 | 5/2003 | Boneh et al. |
| 2003/0111528 | A1 | 6/2003 | Sato et al. |
| 2003/0208677 | A1 | 11/2003 | Ayyagari et al. |
| 2004/0123102 | A1* | 6/2004 | Gehrmann et al. .......... 713/161 |
| 2004/0162983 | A1 | 8/2004 | Gotoh et al. |
| 2004/0168055 | A1 | 8/2004 | Lord et al. |
| 2004/0252831 | A1 | 12/2004 | Uehara |
| 2005/0147244 | A1* | 7/2005 | Moldovyan et al. ........... 380/29 |

FOREIGN PATENT DOCUMENTS

| | | |
|---|---|---|
| CN | 1246007 | 3/2000 |
| EP | 0689316 | 12/1995 |
| EP | 1 005 191 A1 | 5/2000 |
| EP | 1005191 | 5/2000 |
| RU | 2091983 | 9/1997 |
| WO | WO 01/82524 A1 | 11/2001 |
| WO | WO0182524 | 11/2001 |

OTHER PUBLICATIONS

Bellare and Kohno, "Hash Function Balance and Its Impact on Birthday Attacks," *Eurocrypt 2004*, LNCS 3027, pp. 401-418 (2004).

Shoup, "A Proposal for an ISO Standard for Public Key Encryption (version 2.1)," *IBM Zurich Research Lab*, 56 pages (2001).

Bennett et al., "Generalized Privacy Amplification," *IEEE*, pp. 1915-1923 (1995).

M'Raïhi et al., "xmx—a firmware-oriented block cipher based on modular multiplications," *Gemplus—Cryptography Department and Ecole Normale Supérieure*, 6 pages (prior to application filing date).

"Public Key Cryptography for the Financial Services Industry—Key Agreement and Key Transport Using Elliptic Curve Cryptography," *Accredited Standards Committee X9, Inc.*, ANSI X9.63-2001, 400 pages (2001).

"IEEE Standard Specifications for Public-Key Cryptography—Amendment 1: Additional Techniques," *IEEE Computer Society*, 159 pages (2004).

U.S. Appl. No. 08/813,992, filed Mar. 10, 1997, Fielder.

U.S. Appl. No. 08/813,457, filed Mar. 10, 1997, Fielder.

Office Action dated Mar. 7, 2008 issued in U.S. Appl. No. 10/918,717.

Office Action dated Sep. 6, 2007 issued in U.S. Appl. No. 10/918,717.

Office Action dated Aug. 7, 2008 issued in U.S. Appl. No. 10/918,717.

Office Action dated Aug. 6, 2008 issued in U.S. Appl. No. 10/918,103.

Office Action dated Feb. 1, 2008 issued in U.S. Appl. No. 10/918,103.

Office Action issued on Mar. 5, 2009 in related U.S. Patent Application No. 10/918,717.

Notice of Allowance dated Jan. 28, 2009 issued in U.S. Patent Application No. 10/918,103.

Notice of Allowance dated Mar. 20, 2009 issued in U.S. Patent Application No. 10/918,103.

\* cited by examiner

KEY DERIVATION FUNCTIONS TO ENHANCE SECURITY

RELATED APPLICATION DATA

This application is related to U.S. patent application Ser. No. 10/918,717, titled "PERMUTATION DATA TRANSFORM TO ENHANCE SECURITY", filed herewith, and to U.S. patent application Ser. No. 10/918,103, titled "EXPONENTIAL DATA TRANSFORM TO ENHANCE SECURITY", filed herewith, both commonly assigned.

FIELD

This invention pertains to data security, and more particularly to new key derivation functions to enhance security.

BACKGROUND

For thousands of years, man has found it necessary to keep secrets. But for most of history, the art of keeping secrets developed slowly. The Caesar shift cipher, supposedly used by Julius Caesar himself, involved taking a letter and shifting it forward through the alphabet, to hide the message. Thus, "A" became "D", "B" became "E", and so on. Although generally considered a very weak encryption, there were few better encryption algorithms developed until centuries later.

Encryption became a focus of intense research during the two World Wars. Much effort was expended, both in developing codes that the enemy could not break, and in learning how to read the enemy's encrypted mail. Mechanical devices were designed to aid in encryption. One of the most famous of these machines is the German Enigma machine, although Enigma was by no means the only mechanical encryption machine of the era.

The advent of the computer has greatly altered the landscape for the use of encryption. No longer requiring complex machines or hours of manual labor, computers can encrypt and decrypt messages at high speed and for trivial cost. The understanding of the mathematics underlying computers has also introduced new encryption algorithms. The work of Diffie and Hellman led to a way to exchange private keys using exponential arithmetic modulo primes, and relies on the fact that calculating the shared key given the public information is computationally infeasible. And the popular RSA algorithm (named after its inventors: R. Rivest, A. Shamir, and L. Adleman) relies on the fact that factoring large numbers is also computationally infeasible to decrypt encrypted data. The work of Diffie and Hellman, and the RSA algorithm, can theoretically be cracked, but cracking these algorithms would depend on solving mathematical problems that have yet to be solved. (As an aside, the RSA algorithm was also one of the first public-key cryptosystems, using a different key to decrypt than the key used to encrypt. This made it possible to publicly distribute one key without losing security.)

But no encryption algorithm has an infinite life span. For example, DES (the Data Encryption Standard) was originally released in 1976. The government originally estimated its useful life at 10 years. DES has lasted much longer than the original estimated life span, but because of its relatively short key, DES is considered less than ideal. DES has since been replaced by AES (the Advanced Encryption Standard) as the government standard, but DES remains in widespread use. Various improvements to DES exist, but these improvements cannot make DES secure forever. Eventually, DES will generally be considered insecure.

A need remains for a way to enhance the security of existing encryption algorithms.

SUMMARY

The invention is a method and apparatus for performing key derivation from a master key. In one embodiment, a portion of the master key is hashed. Two numbers are derived from another portion of the master key. A universal hash function, using the two numbers, is applied to the result of the hash, from which bits are selected as the derived key.

In another embodiment, a universal hash function, using an encoded counter, is applied to portions of the master key, and the results combined. The combined result is then hashed, from which bits are selected as the derived key.

The foregoing and other features, objects, and advantages of the invention will become more readily apparent from the following detailed description, which proceeds with reference to the accompanying drawings.

DETAILED DESCRIPTION

Figure 1:
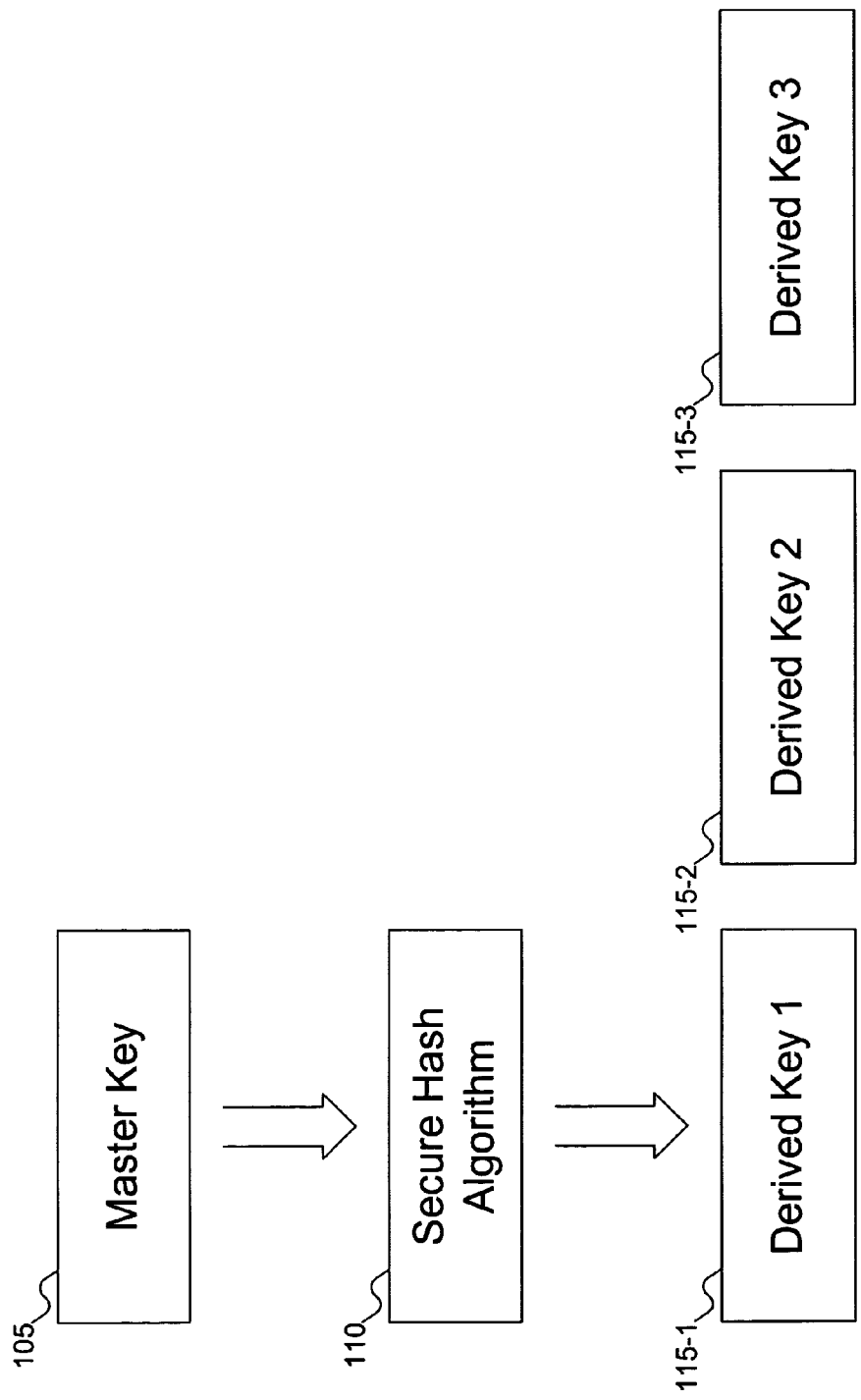
FIG. 1 shows a general implementation of a secure hash algorithm to generate derivative keys from a master key.

FIG. 1 shows a general implementation of a secure hash algorithm to generate derivative keys from a master key. The general concept is that master key 105 is input to secure hash algorithm 110. An example of a secure hash algorithm is SHA-1 (Secure Hash Algorithm 1). The result is derived key 115-1. Secure hash algorithm 110 can be used multiple times. Depending on the implementation of secure hash algorithm 110, master key 105 can be used repeatedly as input to secure hash algorithm 110 with or without modification. For example, if secure hash algorithm 110 uses a clock to control its output, then master key 105 can be used without modification to generated derived keys 115-2 and 115-3. Otherwise, master key 105 can be combined with a counter in some way to modify master key 105 sufficiently to differentiate derived keys 115-2 and 115-3 from derived key 115-1. If secure hash algorithm 105 is properly implemented, then changing as little as a single bit in master key 105 can result in derived keys 115-2 and 115-3 being completely unrelated to derived key 115-1.

Figure 2:
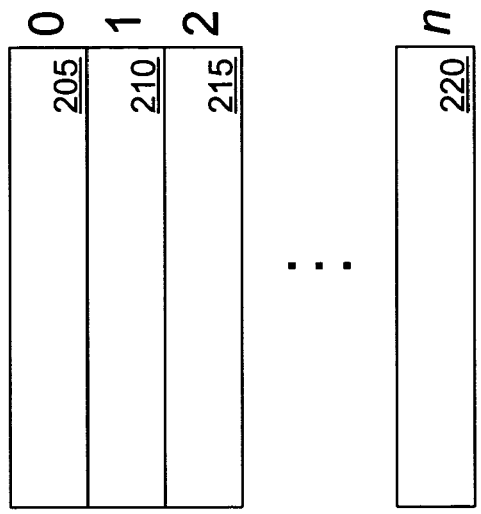
FIG. 2 shows the typical operation of the secure hash algorithm of FIG. 1.

FIG. 2 shows the typical operation of the secure hash algorithm of FIG. 1. As shown, a hash algorithm maps inputs to hash values. In FIG. 2, the hash values vary between 0 and n for some value of n. The output of a hash algorithm can be referred to as baskets; FIG. 2 shows baskets 205, 210, 215, and so on to basket 220.

Unlike a general hash algorithm, which can use any desired mapping to map inputs to baskets, a secure hash algorithm is unpredictable (sometimes also called collision-free): knowing that one input produces a particular output does not give any information about how to find another input that would produce the same output. For example, knowing that an input of "5" maps to basket 215 does not aid someone in finding any other input value that would also map to basket 215. In fact, there may be no other inputs that map to basket 215, for some particular hash algorithms. This is what makes secure hash algorithm 110 "secure": that there is no easy way to find another input that maps to a desired output. The only way to find another input that maps to a particular output is by experimenting with different inputs, in the hope of finding another value that maps to the desired output.

The weakness of a secure hash algorithm is that the baskets might not all be mapped to equally. In other words, there might be only one input that is mapped to basket 215, but 100 inputs that map to basket 205. And as mentioned above, some baskets might have no inputs that map to them.

Figure 3:
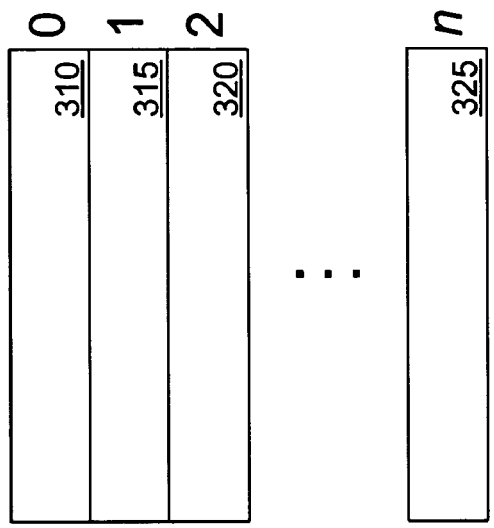
FIG. 3 show the typical operation of a universal hash algorithm.

A universal hash algorithm provides the distribution feature that is missing from a secure hash algorithm. As shown in FIG. 3, universal hash algorithm 305 also maps inputs to baskets 310, 315, 320, up to 325. But unlike the secure hash algorithm of FIG. 2, universal hash algorithm 305 distributes its input evenly across the baskets. Thus, basket 310 is mapped to just as often as basket 315, 320, 325, and so on.

The weakness of a universal hash algorithm is that it is typically easy to find other inputs that map to the same basket. For example, consider the universal hash algorithm that maps to 10 baskets, numbered 0 through 9, by selecting the basket that corresponds to the last digit of the input. It is easy to see that this hash algorithm distributes its output evenly across all baskets. But it is also easy to see how to find another input that maps to the same basket as a given input. For example, 1, 11, 21, 31, etc. all map to basket 315.

Figure 4:
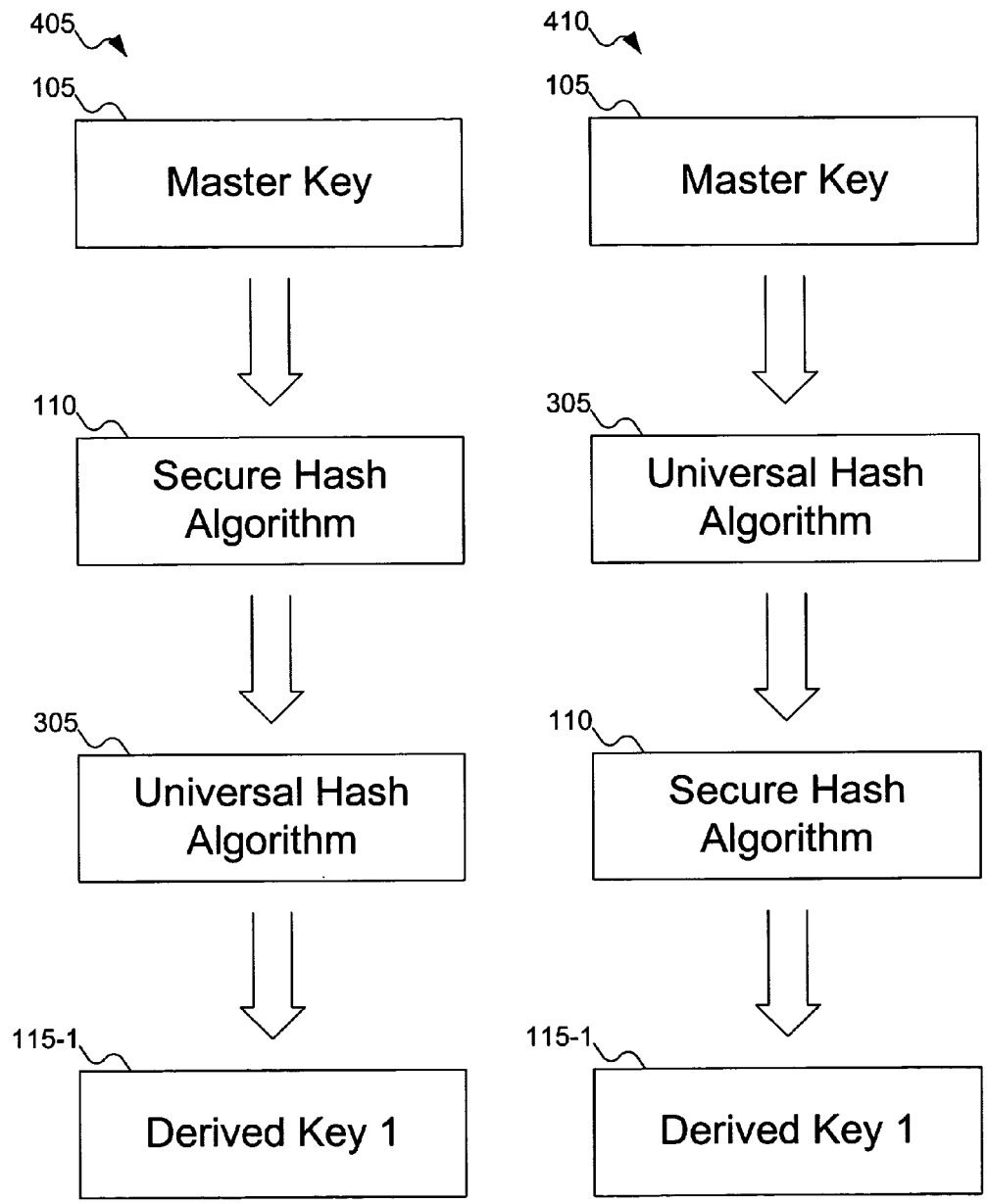
FIG. 4 shows different ways to combine the secure hash algorithm and the universal hash algorithm of FIG. 1 to generate more secure derivative keys, according to an embodiment of the invention.

Thus, it should be apparent that both secure hash algorithms and universal hash algorithms have advantages and disadvantages. The best solution from the point of view of security would be to somehow combine the advantages of both secure hash algorithms and universal hash algorithms. FIG. 4 shows how the secure hash algorithm of FIGS. 1-2 and the universal hash algorithm of FIG. 3 can be combined to generate more secure derivative keys, according to an embodiment of the invention. In sequence 405, master key 105 is first passed to secure hash algorithm 110. The result of secure hash algorithm 110 is then used as input to universal hash algorithm 305, and from the result derived key 115-1 can be generated.

Whereas sequence 405 shows secure hash algorithm 110 being used before universal hash algorithm 305, sequence 410 reverses this ordering. Thus, master key 105 is used as input to universal hash algorithm 305. The result of universal hash algorithm 305 is then used as input to secure hash algorithm 110, from which result derived key 115-1 can be generated.

Secure hash algorithm 110 and universal hash algorithm 305 can be implemented in any desired form. For example, secure hash algorithm 110 and universal hash algorithm 305 can be implemented in any variety of Read Only Memory (ROM), in firmware, or as software stored in a memory, to provide a few examples where the implementations of secure hash algorithm 110 and universal hash algorithm 305 are executed by general purpose processors. Implementations can also include dedicated devices: for example, a processor can be specifically designed to implement secure hash algorithm 110 and universal hash algorithm 305. Thus, as another example, a calculator can be designed to implement either secure hash algorithm 110 or universal hash algorithm 305. A person skilled in the art will recognize other ways in which secure hash algorithm 110 and universal hash algorithm 305 can be implemented.

Figure 5:
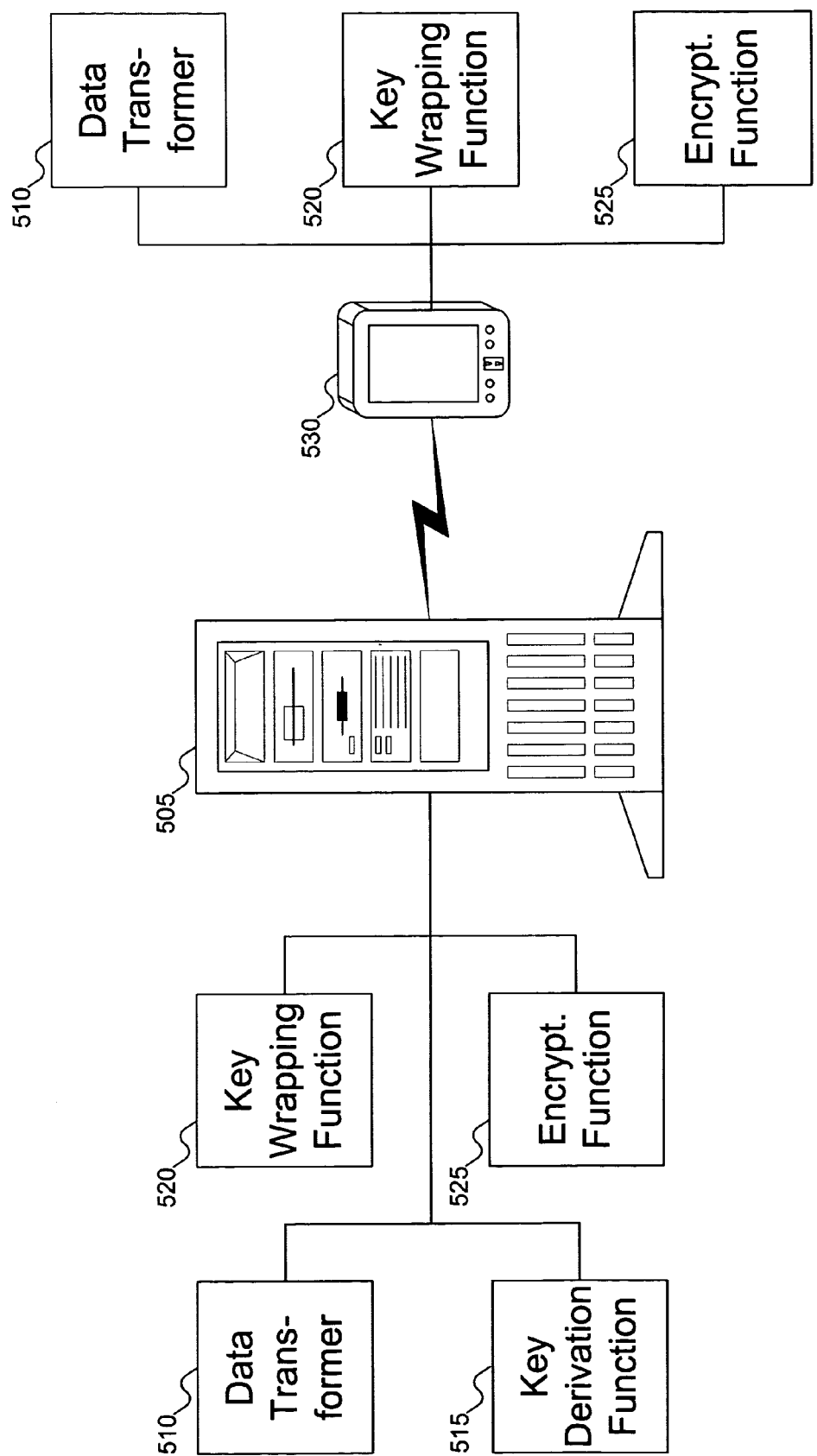
FIG. 5 shows a server and device capable of performing data transformations, key generation, key wrapping, and data encryption, according to an embodiment of the invention.

FIG. 5 shows a server and device capable of performing data transformations, key generation, key wrapping, and data encryption, according to an embodiment of the invention. In FIG. 5, server 505 is shown. Server 505 includes data transformer 510, key derivation function 515, key wrapping function 520, and encryption function 525. Data transformer 510 is responsible for performing a data transformation. As will be discussed below with reference to FIGS. 8-9, 10A-10C, and 11, data transformations, while intrinsically not secure, increase the complexity of encoded data by scrambling the data, thereby making cryptanalysis more difficult. For example, data transformation can mask patterns that exist in the encoded, but not transformed, data.

Key derivation function 515 is responsible for deriving keys for use in encrypting data. Although it is true that any key can be used to encrypt data, the more a particular key is used, the more likely it is that the key can be determined with cryptanalysis. Thus, some systems rely on a master key to generate derived keys, which are then used to encrypt the data. As often as desired, a new derived key can be generated; any data encrypted using only derived keys will then provide no value in breaking messages encrypted with the new derived key. Existing key derivation functions exist; three new key derivation functions are described below with reference to FIGS. 12-13 and 15-16.

Key wrapping function 520 is responsible for wrapping a key for transmission. Key wrapping is typically accomplished by encrypting the key for transmission. As an example, RSA can be used to encrypt (that is, wrap) the key. The key, now sufficiently secured, can be transmitted, even over insecure connections, to other machines, where the key can be unwrapped (decrypted) and used for data encryption/decryption.

Often, the wrapped key is a key for use with a private key, or symmetric, cryptosystem, which is wrapped using a public key, or asymmetric, cryptosystem. A private key cryptosystem is one where the same key is used to encrypt and decrypt, as opposed to a public key cryptosystem, which use different keys to encrypt and decrypt. For example, DES and AES are private key cryptosystems; RSA is a public key cryptosystem. While public key cryptosystems make it possible to safely distribute a key (there is no worry that the key can be intercepted and used by a third party to decrypt private messages), public key cryptosystems often are slower to implement and result in longer messages than private key cryptosystems. Obviously, to wrap a key using a public key cryptosystem, server 505 needs to know the public key of the device to which the wrapped key is to be communicated. But a person skilled in the art will recognize that any encryption algorithm can be used to wrap the key, and that the key to be wrapped can be for any kind of cryptosystem.

Encryption function 525 is used to encrypt data. Typically, the data is encrypted using the key that is wrapped using key wrapping function 520, although a person skilled in the at will recognize that any key can be used to encrypt the data, that the data can be any data that is desired to be encrypted, and that any desired encryption function can be used.

FIG. 5 also shows device 530 capable of performing data transformations, key wrapping, and data encryption, according to an embodiment of the invention. Despite the fact that device 530 looks like a personal digital assistant (PDA), a person skilled in the art will recognize that device 530, as well as server 505, can be any device using security algorithms. Thus, for example, device 530 might be a computer (e.g., a desktop or notebook computer), exchanging files with server 505 (which might be an ordinary computer, and not a server per se). Or, device 530 might be digital media device: e.g., to present digital content to a user, with server 505 providing the content to device 530. Alternatively, device 530 might receive the content from any legitimate source, with server 505 specifying the rights granted to device 530 with respect to the content. Or, device 530 might be software to implement some functionality stored on some medium used with a general-purpose machine, such as a computer. In this variation, what makes device 530 part of the system shown in FIG. 5 is less dependent on the hardware of device 530, and more dependent on the software being executed by device 530. A person skilled in the art will recognize that the software can implement any desired functionality, and that the software can be stored on any appropriate medium, such as a floppy disk, any variety of compact disc (CD) or digital video disc (DVD, sometimes also called a digital versatile disc), a tape medium, or a Universal Serial Bus (USB) key, to name a few of the more popular possibilities. Or, device 530 might be a cellular telephone and server 505 a base station, where the cellular telephone and the base station are communicating in an encrypted manner. A person skilled in the art will recognize other variations for device 530 and server 505, and will also recognize that the manner in which server 505 and device 530 communicate can be any manner of communications channel: e.g., wireline, wireless, or any other form of communication.

Device 530 is similar to server 505 of FIG. 5, in that includes data transformer 510, key wrapping function 520, and encryption function 525. Note that unlike server 505 of FIG. 5, device 530 does not include key derivation function 515. This is because key derivation is generally only needed on server 505. Provided there is a way to communicate with the other device, only one device needs to generate the derivative key. Of course, if there is no way to securely communicate the derivative key but both devices can accurately generate the same derivate key, then device 530 can include key derivation function 515 (although then device 530 might not need key wrapping function 520).

Figure 6:
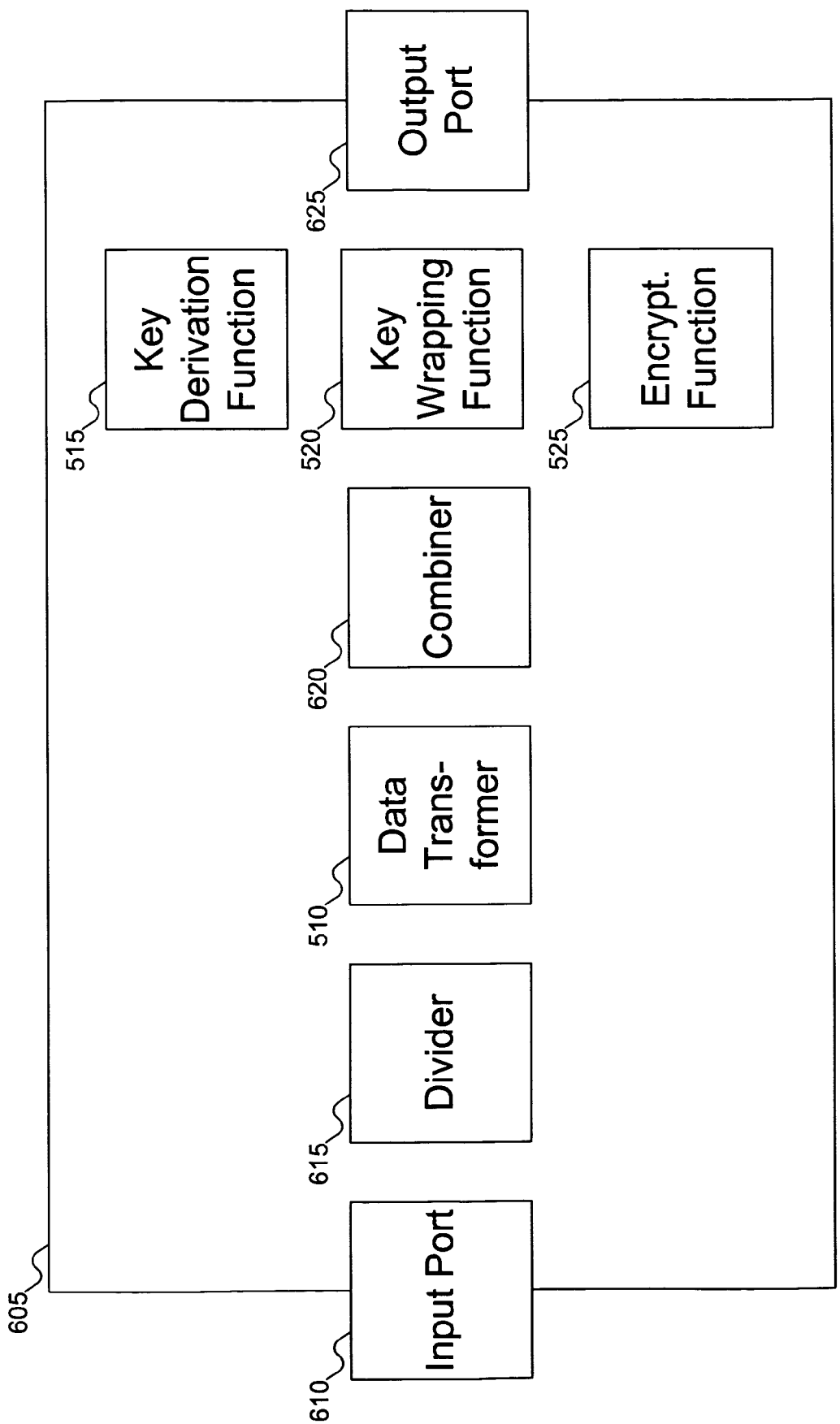
FIG. 6 shows a data security device operable to enhance security by using a data transformer in combination with a key wrapper, key deriver, or an encryption function, according to an embodiment of the invention.

FIG. 6 shows a data security device operable to enhance security by using a data transformer in combination with a key wrapper, key deriver, or an encryption function, according to an embodiment of the invention. Data security device 605 can be part of either server 505 or device 530 of FIG. 5, with modification as needed to add or remove components. In data security device 605, input port 610 is responsible for receiving data. The data can be a master key from which to generate a derivative key, a key to be wrapped, or data to be encrypted, among other possibilities. Divider 615 is responsible for dividing the data into blocks. As discussed below with reference to FIGS. 12-13 and 14-16, sometimes the functions apply data transformations to multiple portions of the data; divider 615 breaks the data up into blocks of the desired sizes so that data transformer 510 can be applied to each block. Data transformer 510 is responsible for performing the data transformation, which is discussed further below with reference to FIGS. 12-13 and 14-16. Combiner 620 is responsible for combining the blocks, after their data transformation, back together for application of the appropriate security function. Various security functions that can be used include key derivation function 515, key wrapping function 520, or encryption function 525. Finally, output port 625 outputs the data, after transformation and/or application of the security function.

It is worth noting that, although typically divider 615 breaks the data into blocks that conform to the size of the data transformation algorithm, this is not required. Thus, divider 615 might break the data up into blocks that are smaller or larger than the expected input to data transformer 510. If divider 615 breaks the data up into blocks that are smaller than expected by data transformer 510, the data can be padded to make them large enough; if divider 615 breaks the data up into blocks larger than expected by data transformer 510, data transformer 510 can apply the data transformation to only as many bits of the data as it needs. For example, if data transformer 510 is implemented as described in the embodiment of FIG. 10, data transformer 510 operates on 8 byte inputs. If data transformer 510 receives more than 8 bytes, data transformer 510 can apply to only 8 bytes of the input. These can be any 8 bytes within the data: e.g., the first 8 bytes, the last 8 bytes, or any other desired combination.

It is also worth noting that any data can be transformed. Thus, the data to be transformed can be a master key, where the transformed master key is to be used to generate derivative keys. Or, the data can be a derivative key that is to be wrapped before transmission. Or, the data can be data that is to be encrypted using an implementation of an encryption algorithm. A person skilled in the art will recognize other types of data that can be transformed.

Figure 7A:
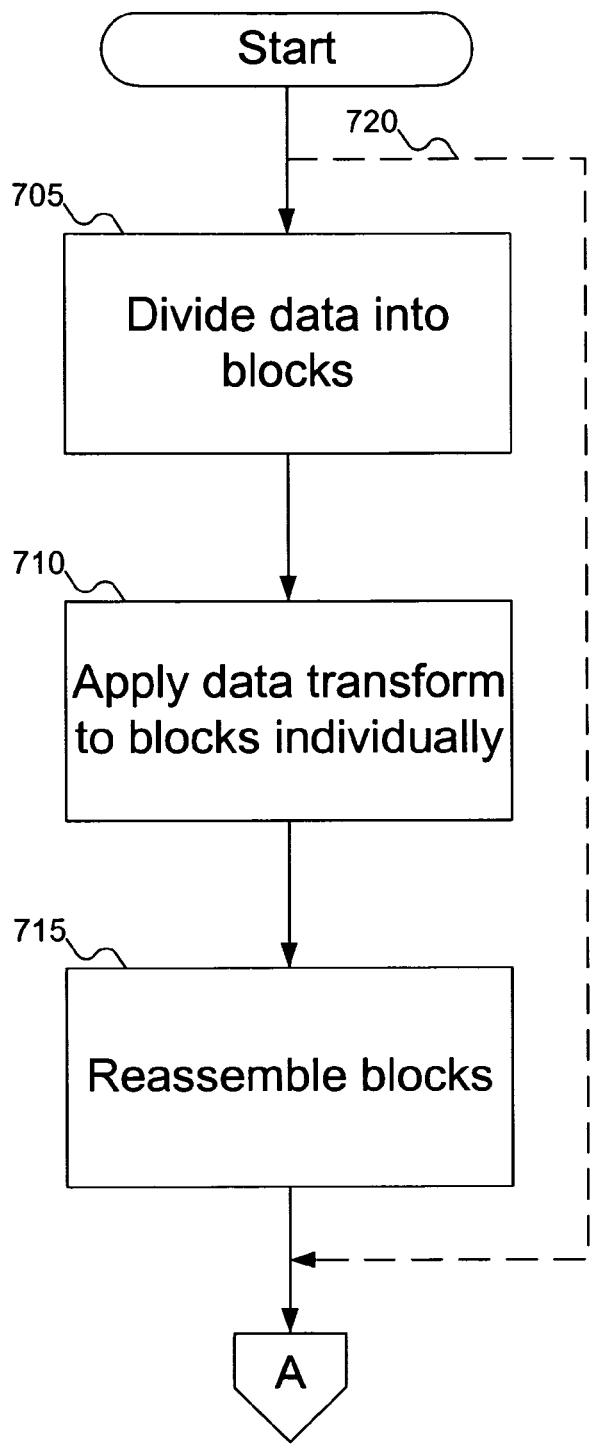
FIGS. 7A-7B show a flowchart for using the data security device of FIG. 6, according to an embodiment of the invention.
Figure 7B:
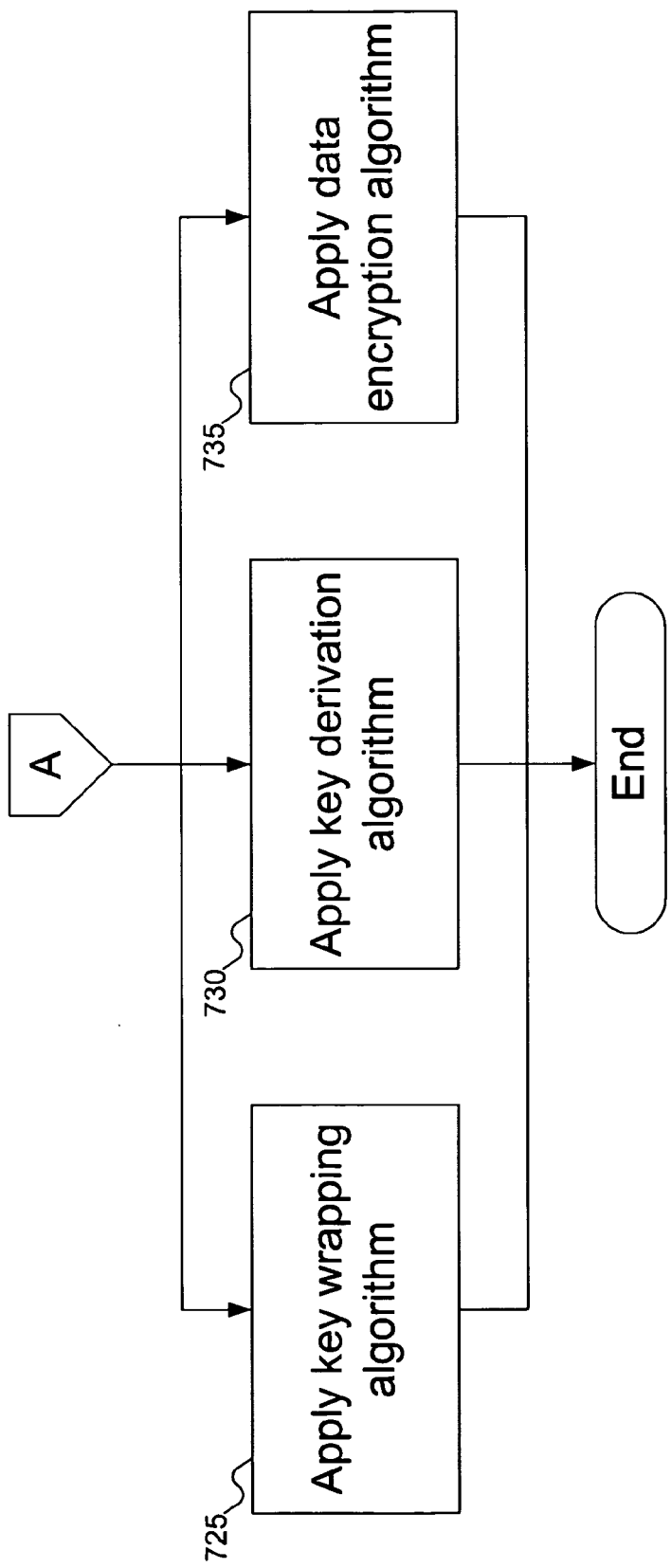

FIGS. 7A-7B show a flowchart for using the data security device of FIG. 6, according to an embodiment of the invention. In FIG. 7A, at block 705, the data is divided into blocks. At block 710, each of the blocks can be transformed using a data transformation. Each of blocks can be independently data transformed or not, as desired; in other words, some blocks might be transformed, and others not. At block 715, the blocks can be reassembled. As shown by dashed line 720, blocks 705-715 are optional, and can be skipped if not needed.

In FIG. 7B, the data security device can be used in different ways. At block 725, a key wrapping algorithm can be applied to the data. At block 730, a key derivation algorithm can be applied to the data. And at block 735, a data encryption algorithm can be applied to the data.

Figure 8:
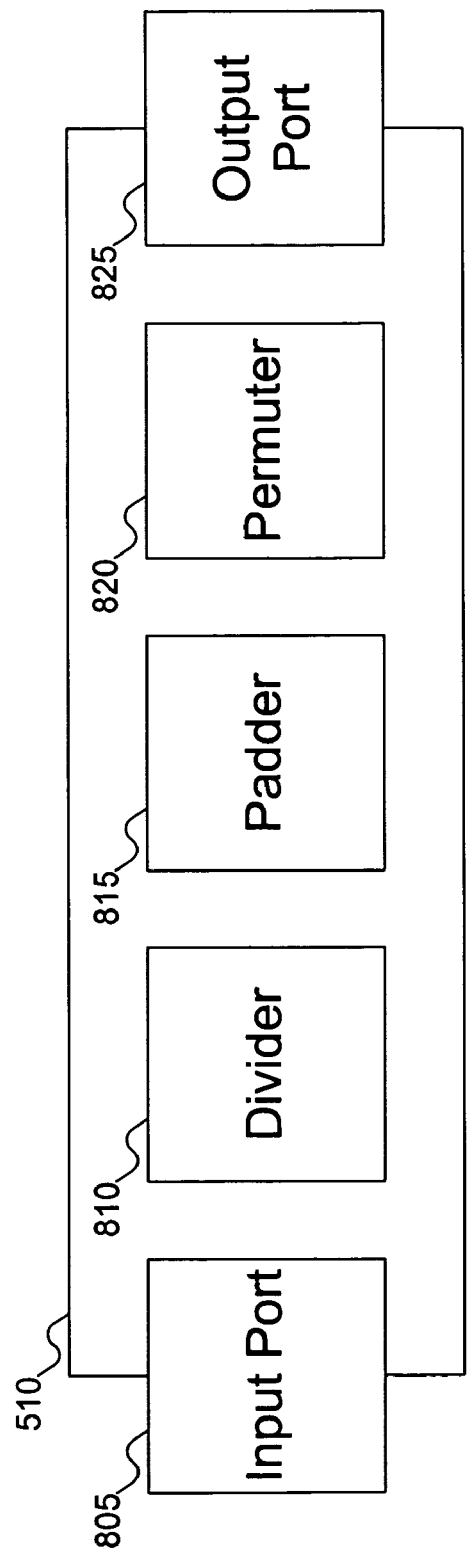
FIG. 8 shows details of the data transformer of FIGS. 5 and 6, according to an embodiment of the invention.

FIG. 8 shows details of the data transformer of FIGS. 5 and 6, according to an embodiment of the invention. In the embodiment of data transformer 510 shown in FIG. 8, data transformer 510 operates by permuting bit groups using permutation functions. Data transformer 510 includes input port 805 to receive data to be transformed, divider 810, padder 815, permuter 820, and output port 825 to output the transformed data. Divider 810 is responsible for dividing the input data into the bit groups for application of the permutation functions. In fact, divider 810 starts by dividing the data into two segments. The first segment includes bits that are used to control the application of the permutation functions on the bit groups, which are portioned from the second segment. In one embodiment, the data includes 64 bits; the first segment includes 8 bits, and the second segment includes 8 7-bit groups. But a person skilled in the art will recognize that the data can be of any length, and the data can be divided into groups of any desired lengths, even with different groups being of different length. Finally, the first segment, which includes the bits that control the application of the permutation groups, can be omitted, if the individual groups are always permuted.

If data transformer 510 supports receiving data of unpredictable sizes (instead of assuming that the data is always of a fixed size), then divider 810 might not be able to divide the data into bit groups properly. Padder 815 can be used to pad the data with additional bits, so that the data is of appropriate length to be properly divided.

In one embodiment, the application of the permutation functions is controlled by the bits of the first segment: a bit group is permuted using a particular permutation function if a corresponding bit in the first segment is set. For example, if the corresponding bit has the value of 1, then the corresponding group is permuted using the appropriate permutation function; if the corresponding bit has the value 0, then the corresponding group is not permuted. Alternatively, if the corresponding bit has the value 0, the corresponding bit group can be viewed as having been permuted using the identity permutation function. The permutation functions can be indexed as well; if the number of permutation function matches the number of bit groups in the second segment (and therefore also matches the number of bits in the first segment), then a single index can identify three corresponding elements: a bit in the first segment, a bit group in the second segment, and a permutation function to apply to the bit group.

Permuter 820 is responsible for controlling the permutation of the bit groups of the second segment. In one embodiment, permuter 820 implements permutations according to the functions shown in Table 1 below, although a person skilled in the art will recognize that any permutation functions can be used.

TABLE 1

| Function | Permutation (of a b c d e f g) |
|---|---|
| $P_1$ | f a e b d g c |
| $P_2$ | g f d a b c e |
| $P_3$ | c g b f a e d |
| $P_4$ | e c a g f d b |
| $P_5$ | d e f c g b a |
| $P_6$ | b d g e c a f |
| $P_7$ | e c a g f d b |
| $P_8$ | c g b f a e d |

There are some interesting features of the permutations shown in Table 1. First, each of the permutation functions is a power of permutation function $P_1$. Thus, $P_2 = P_1 \circ P_1$, $P_3 = P_2 \circ P_1$ ($= P_1 \circ P_1 \circ P_1$), etc. Because $P_6 \circ P_1$ would result in $P_1$ again, $P_7$ and $P_8$ are chosen to repeat earlier powers of $P_1$. This means that data transformer 510 only needs to know the implementation of one permutation function; the rest of the permutation functions can be derived from the base permutation function. Second, the permutations of Table 1 do not introduce any structures in the data that are similar to those found in encryption functions such as RSA, DES, AES, SHA-1, etc.

Because permutation functions are invertible, the data transformation that results from applying the permutation functions of Table 1 is easily reversible. Table 2 shows the permutation functions that are the inverses of the permutation functions of Table 1.

TABLE 2

| Function | Permutation (of a b c d e f g) |
|---|---|
| $P_1^{-1}$ | b d g e c a f |
| $P_2^{-1}$ | d e f c g b a |
| $P_3^{-1}$ | e c a g f d b |
| $P_4^{-1}$ | c g b f a e d |
| $P_5^{-1}$ | g f d a b c e |
| $P_6^{-1}$ | f a e b d g c |
| $P_7^{-1}$ | c g b f a e d |
| $P_8^{-1}$ | e c a g f d b |

Thus, to reverse the data transformation applying the permutation functions of Table 1, all that is needed is to apply a second data transformation, using the permutation functions of Table 2. To make this reverse transformation possible, output port 825 outputs the bits of the first segment directly, along with the permuted groups; otherwise, a receiver of the transformed data would not know which bit groups have been permuted.

As with the permutation functions of Table 1, all of the permutation functions in Table 2 can be derived from a single base function: in this case, $P_6^{-1}$. Thus, $P_5^{-1} = P_6^{-1} \circ P_6^{-1}$, $P_4^{-1} = P_5^{-1} \circ P_6^{-1}$ ($= P_6^{-1} \circ P_6^{-1} \circ P_6^{-1}$), etc.

Figure 9:
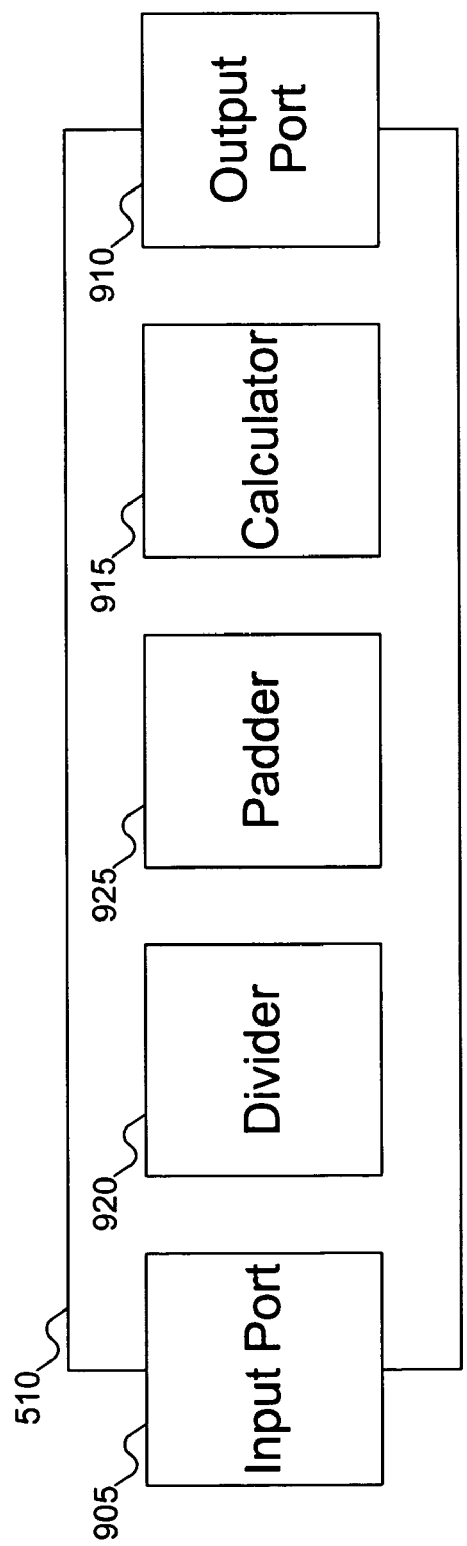
FIG. 9 shows details of the data transformer of FIGS. 5 and 6, according to another embodiment of the invention.

FIG. 9 shows details of the data transformer of FIGS. 5 and 6, according to another embodiment of the invention. In FIG. 9, input port 905 and output port 910 operate similarly as in data transformer 510 of FIG. 8. But rather than permuting the data using permutation functions, data transformer 510 of FIG. 9 operates by computing an exponential permutation on the data: this calculation is done by calculator 915. In one embodiment, data transformer 510 operates on data input that is 3 bytes long. The first segment is used to calculate a power, to which the last two bytes are raised. The result is then taken modulo a modulus. For example, one embodiment computes the data transformation as $Y = ((B+1)^{(2A+1)} \mod 65537) - 1$, where A is the first byte of the data input and B is the last two bytes of the data input. The transformed data then includes A and Y, and is 3 bytes long. But a person skilled in the art will recognize that the input can be of different lengths, and that different exponential permutation functions can be applied.

The above-shown exponential permutation function has some advantages. First, abstract algebra shows that where the exponent and the modulus (minus one) are relatively prime, the function cycles through all possible values between 1 and the modulus, which means that the exponential permutation function is a permutation. By selecting 65537 as the prime number, one less than 65537 is 65536, which is a power of 2. Thus, regardless of the value of A, (2A+1) is odd, and is therefore relatively prime to 65536. Second, if A is 0, then the data output is unchanged. Finally, as with the permutation data transformer of FIG. 8, the structure of data transformer 510 of FIG. 9 uses a structure not existing in cryptographic algorithms such as RSA, DES, AES, SHA-1, etc.

If data transformer 510 supports receiving data of unpredictable sizes (instead of assuming that the data is always of a fixed size), then divider 920 might not be able to divide the data into segments of appropriate size. Padder 925, as with padder 815 in the data transformer of FIG. 8, can be used to pad the data with additional bits, so that the data is of appropriate length to be properly divided.

As with the permutation data transformer of FIG. 8, data transformer 510 of FIG. 9 is reversible. To make it possible to reverse the data transformation, output port 910 outputs A unchanged along with Y. Then, to reverse the exponential permutation, calculator 915 computes the inverse of 2A+1 modulo 65536 (that is, 65537-1). If this inverse is called e, then the reverse exponential permutation is $((Y+1)^e \mod 65537)-1$. The result of this calculation restores the original bytes B. Thus, the exponential permutation can be reversed simply by applying a second data transformation, changing the exponent of the data transformer.

Figure 10A:
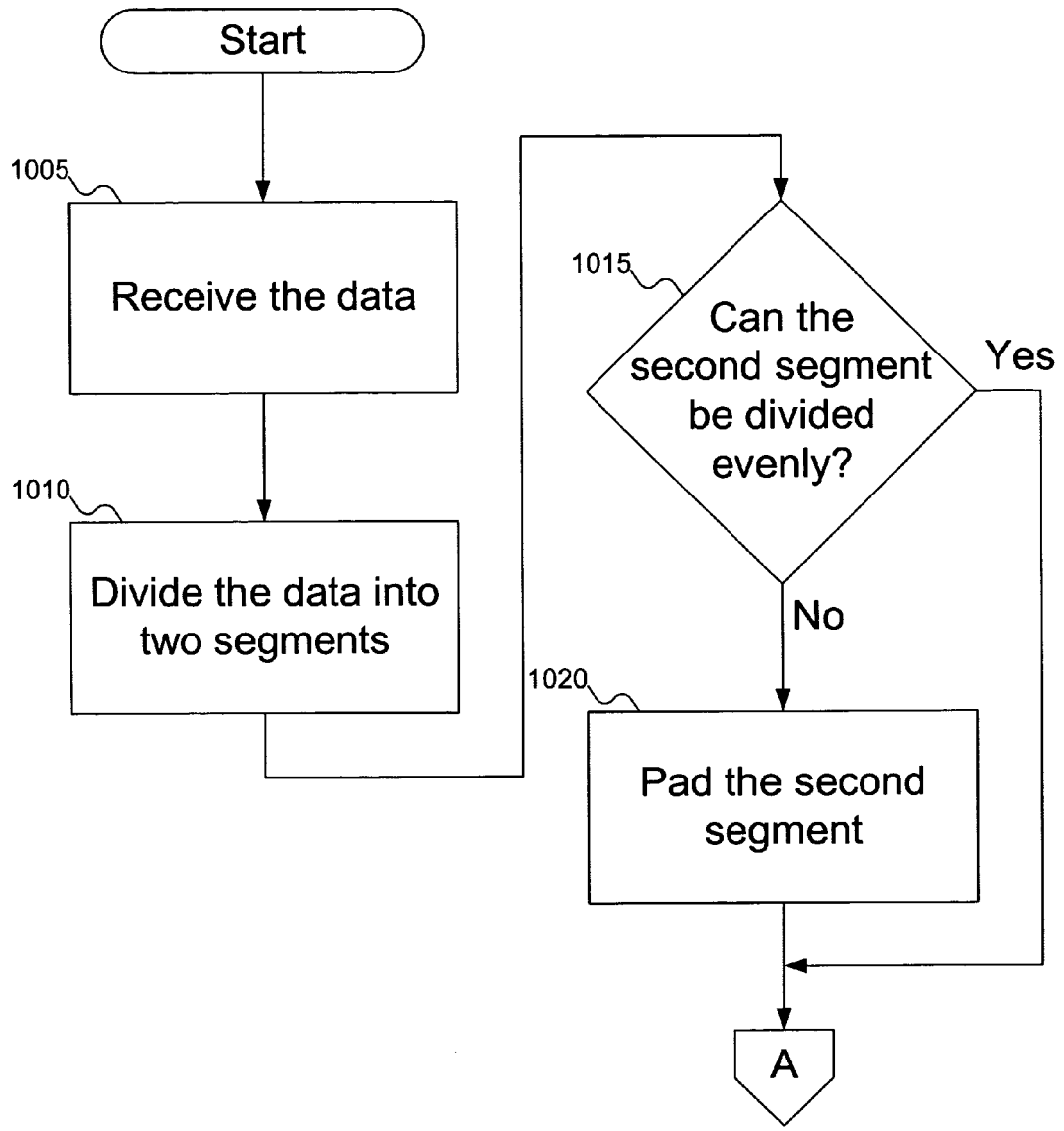
FIGS. 10A-10C show a flowchart for using the data transformer of FIG. 8, according to an embodiment of the invention.
Figure 10B:
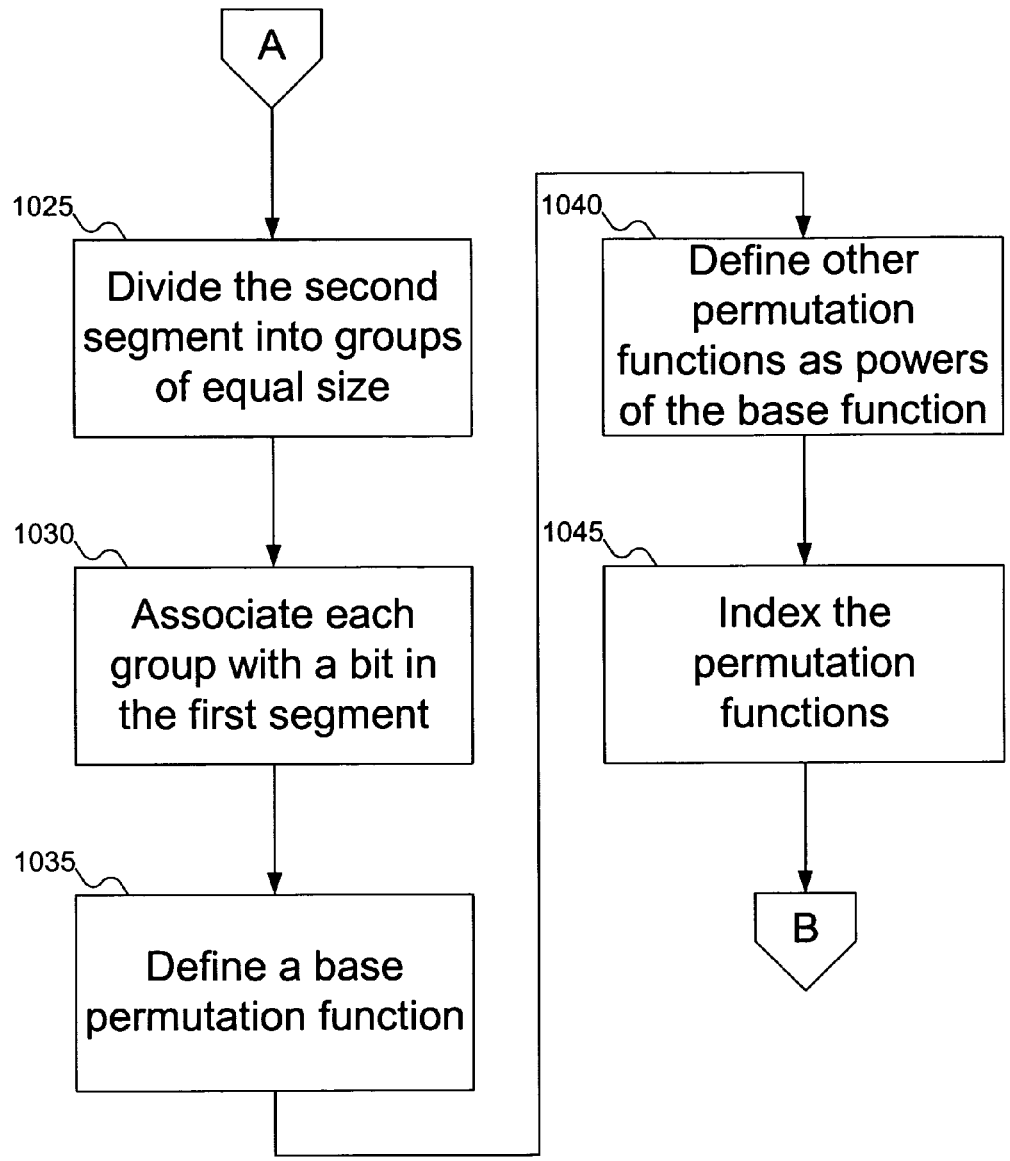
Figure 10C:
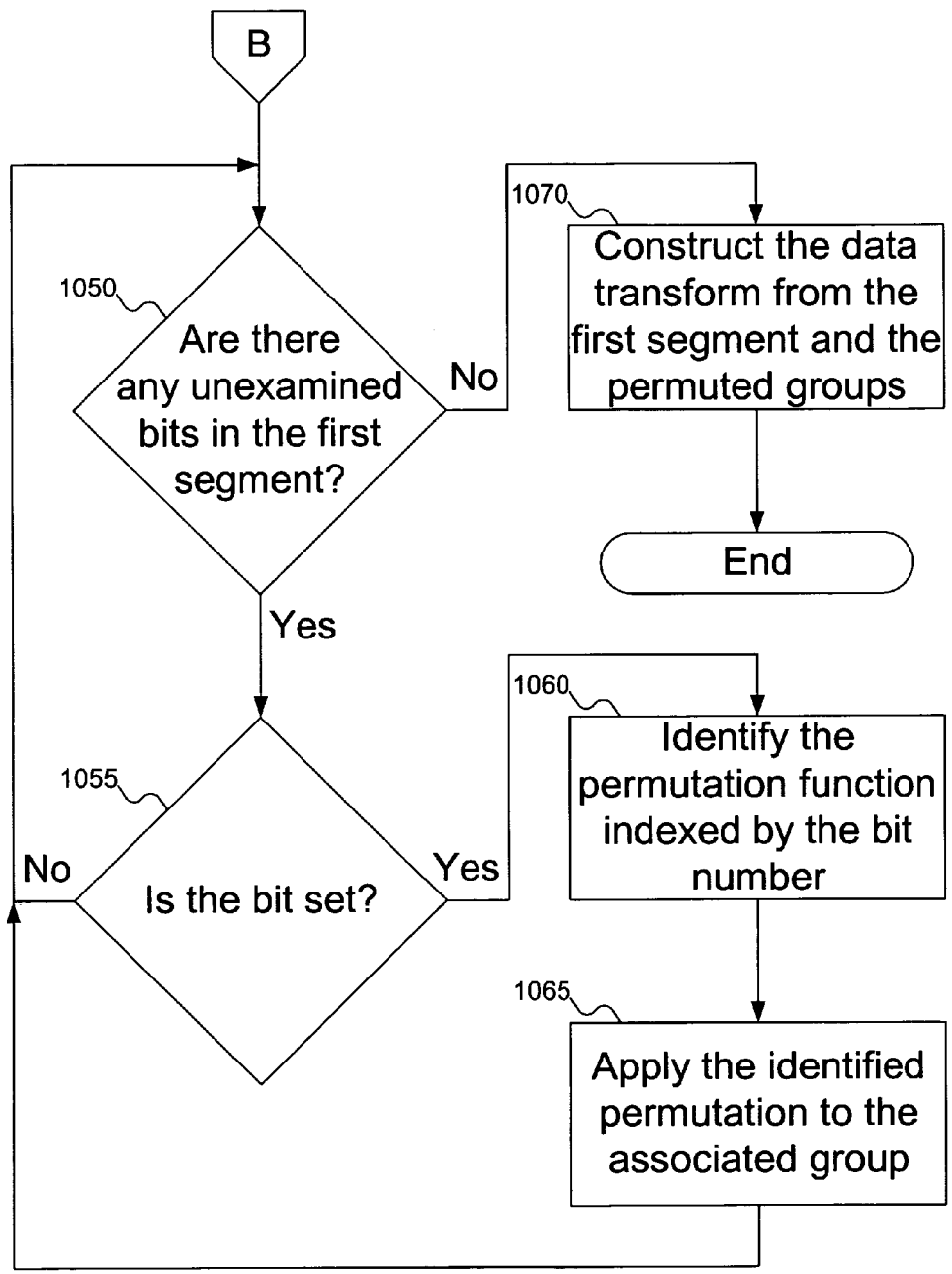

Now that the apparatuses of FIGS. 8 and 9 have been presented, the methods of their use can be understood. FIGS. 10A-10C show a flowchart for using the data transformer of FIG. 8, according to an embodiment of the invention. In FIG. 10A, at block 1005, the data is received. At block 1010, the data is divided into two segments (assuming that the permutation of bit groups are controlled by bits in the first segment). At block 1015, the data transformer checks to see if the second data segment can be divided evenly into groups. If not, then at block 1020 the data is padded to support dividing the second segment into evenly-sized groups. (This assumes that the data transformer attempts to divide the data input into evenly-sized groups; if the data transformer does not need to divide the input data into evenly-sized groups, then blocks 1015 and 1020 can be omitted.)

At block 1025 (FIG. 10B), the second segment is divided into bit groups. Although block 1025 describes the second segment as being divided into groups of equal size, as described above, the groups can be divided into groups of unequal size, if the data transformer supports this. At block 1030, each group is associated with a bit in the first segment. At block 1035, a base permutation function is defined. At block 1040, other permutation functions are defined as powers of the base permutation function. (Again, there is no requirement that the permutations be powers of a base permutation function; each of the permutation functions can be unrelated to the others, in which case blocks 1035 and 1040 can be modified/omitted.) At block 1045, the permutation functions are indexed.

At block 1050 (FIG. 10C), the data transformer checks to see if any bits in the first segment (which controls the application of the permutation functions to the bit groups in the second segment) have yet to be examined. If there are unexamined bits, then at block 1055 the data transformer examines the bit to see if it is set. If the bit is set, then at block 1060 the permutation function indexed by the bit is identified, and at block 1065 the identified permutation is applied to the associated permutation group. Control then returns to block 1050 to see if there are any further unexamined bits in the first segment. After all bits in the first segment have been examined, then at block 1070 the data transformer constructs the data transformation from the first segment and the permuted bit groups.

Figure 11:
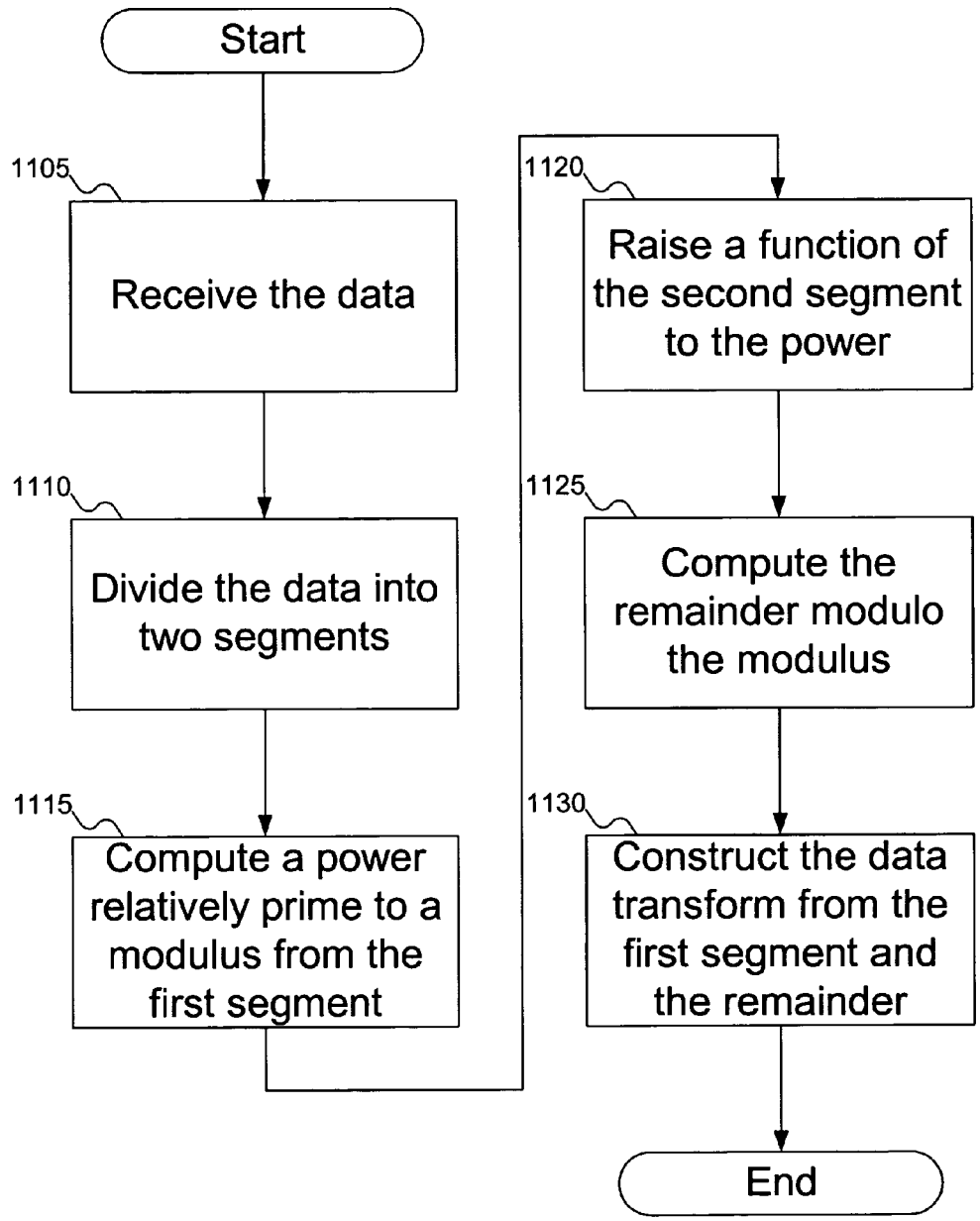
FIG. 11 shows a flowchart for using the data transformer of FIG. 9, according to an embodiment of the invention.

FIG. 11 shows a flowchart for using the data transformer of FIG. 9, according to an embodiment of the invention. At block 1105, the data transformer receives the data. At block 1110, the data transformer divides the data into two segments. At block 1115, the first segment is used to construct a power that is relatively prime to the selected modulus. At block 1120, the second segment is raised to the computed power. At block 1125, the remainder is computed by taking the result modulo the modulus. Finally, at block 1130, the data transform is constructed from the first segment and the remainder.

Figure 12:
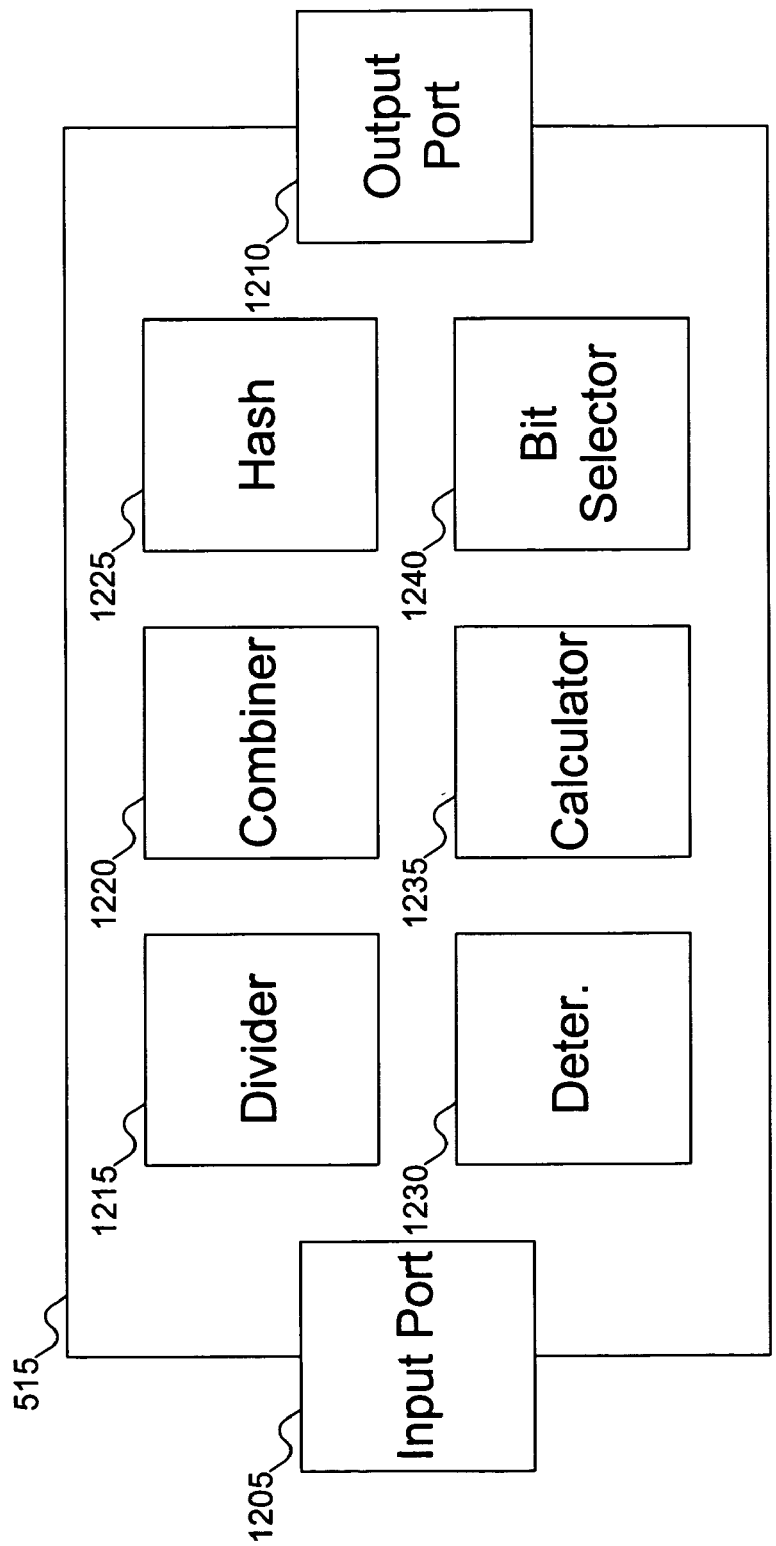
FIG. 12 shows details of the key derivation function of FIGS. 5 and 6, according to an embodiment of the invention.

As discussed above with reference to FIG. 5, existing key derivation functions exist. But the existing key derivation functions do not provide the advantages of both the secure hash function and the universal hash function, as described above with reference to FIG. 4. FIG. 12 shows details of one key derivation function that combine the advantages of a secure hash function and a universal hash function. In FIG. 12, key derivation function 515 includes input port 1205 and output port 1210, which are used to provide the inputs to the key derivation function and the output derived key, respectively. Key derivation function 515 also includes divider 1215, combiner 1220, hash 1225, determiner 1230, calculator 1235, and bit selector 1240.

Divider 1215 divides the master key into two parts. Combiner 1220 combines the first part of the master key with a counter, which can be part of the input data. One way to combine the master key with the counter is by concatenating the first part of the master key with the counter, which can be of any size (e.g., 4 bytes). This concatenation can be performed in either order: that is, either the first part of the master key or the counter can be the front of the combination. The result of this combination is then hashed using hash function 1225, which can be a secure hash function. (In this embodiment, hash function 1225 takes the place of secure hash algorithm 110 in sequence 405 of FIG. 4.)

Determiner 1230 is used to determine two numbers from the second part of the master key. In one embodiment, these two numbers, a and b, are determined as the first and last 32 bytes of the second part of the master key, modulo a prime number p. Selecting a and b in this manner calls for the master key to be of sufficient length for the second part of the master key to be 64 bytes long. But a person skilled in the art will recognize that the master key does not necessarily have to be this long. For example, if computing a and b modulo p sufficiently alters the bits of a and b, a and b might be selected in such a way that their original bits overlap from within the second part of the master key.

A particular choice for the prime number can be $p_{192}=2^{192}-2^{64}-1$, although a person skilled in the art will recognize that other primes can be selected instead. Calculator 1235 can then implement the universal hash function of ax+b mod p, where x is the result of hash 1225. (This universal hash function takes the place of universal hash algorithm 305 in sequence 405 of FIG. 4.) Finally, bit selector 1240 selects the bits from the result of the universal hash function for the derived key, which can then be output. For example, bit selector 1240 can select the least significant bits of the result of the universal hash function as the derived key.

Figure 13:
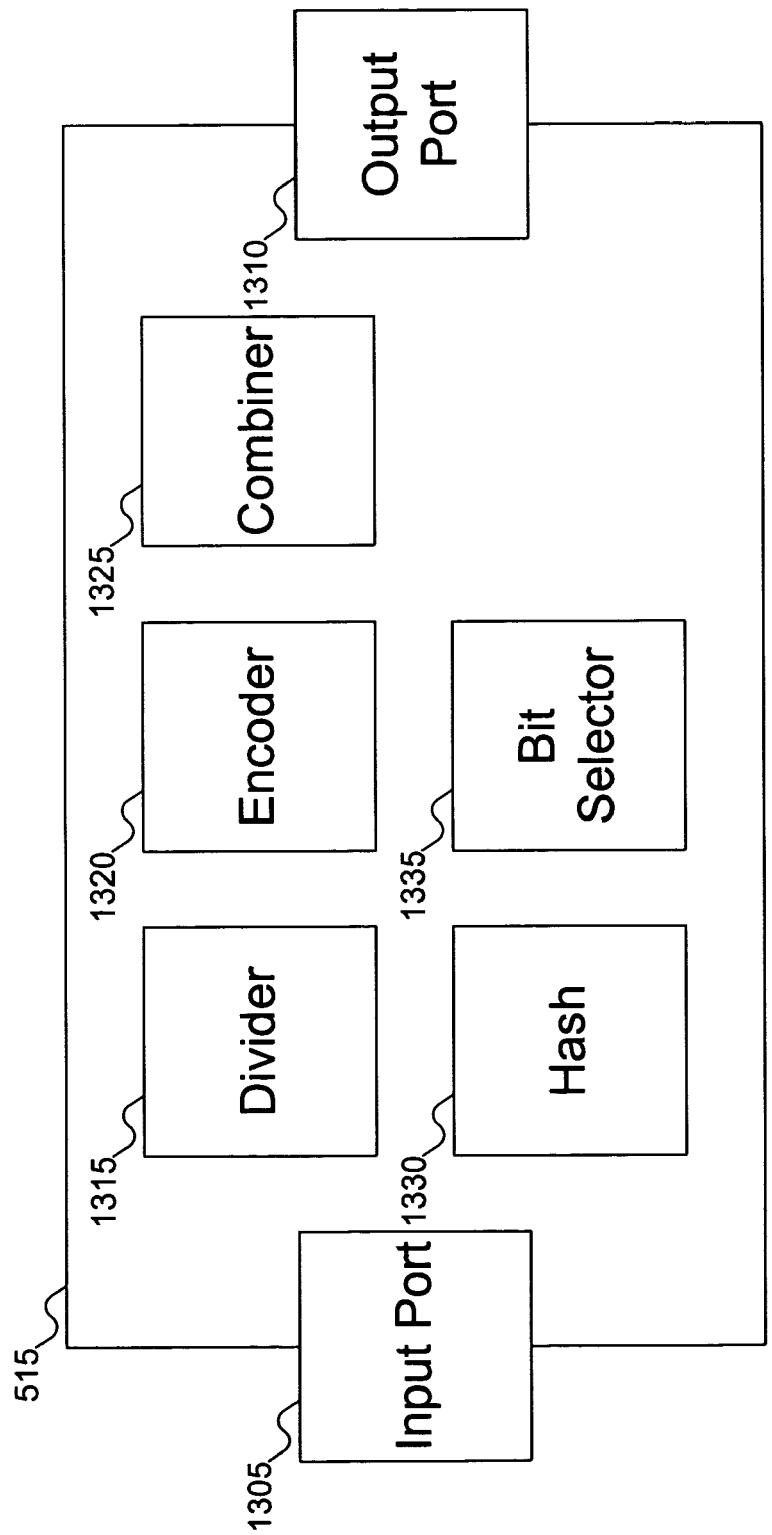
FIG. 13 shows details of the key derivation function of FIGS. 5 and 6, according to another embodiment of the invention.

FIG. 13 shows details of the key derivation function of FIGS. 5 and 6, according to another embodiment of the invention. In contrast to the embodiment of the invention shown in FIG. 12, which implements a key derivation function according to sequence 405 of FIG. 4, key derivation function 515 of FIG. 13 does not apply the universal hash algorithm after the secure hash algorithm. Instead, the embodiment of the invention shown in FIG. 13 applies a liner mapping to the input to the secure hash algorithm.

As with key derivation function 515 of FIG. 12, key derivation function 515 of FIG. 13 includes input port 1305 and output port 1310, which receive the master key as input and output the derived key, respectively. Key derivation function 515 of FIG. 13 also includes divider 1315, encoder 1320, combiner 1325, hash 1330, and bit selector 1335.

Divider 1315, as with divider 1215 of FIG. 12, divides the master key into two parts. Encoder 1320 then encodes a counter. Encoder 1320 can operate in any manner desired. For example, encoder 1320 can operate by repeating the counter to extend it to the length of the first part of the master key. So, for example, if the first part of the master key is 64 bytes long and the counter is represented using 4 bytes, encoder 1320 can repeat those 4 bytes 16 times, to extend the counter to a 64 byte length. Combiner 1325 can then combine the encoded counter with each part of the master key separately. For example, combiner 1325 can combine the parts of the master key and the encoded counter at the bit level. One embodiment uses an XOR binary function to combine the parts of the master key and the encoded counter. But a person skilled in the art will recognize that combiner 1325 can use any bitwise binary function, or indeed any function, to combine the parts of the master key and the encoded counter. Combiner 1325 can then recombine the two parts of the master key (after the combination with the encoded counter) back together: for example, the two parts can be concatenated together (but a person skilled in the art will recognize that combiner 1325 can recombine the two parts of the master key in other ways). Combiner 1325 can also concatenate the recombined parts of the master key with the encoded counter one more time.

Hash 1330 takes the output of combiner 1325 and hashes it. Hash 1330 can be a secure hash function. Bit selector 1335, as with bit selector 1240 in FIG. 12, can then select bits from the result of hash 1330 as the derived key.

Figure 14:
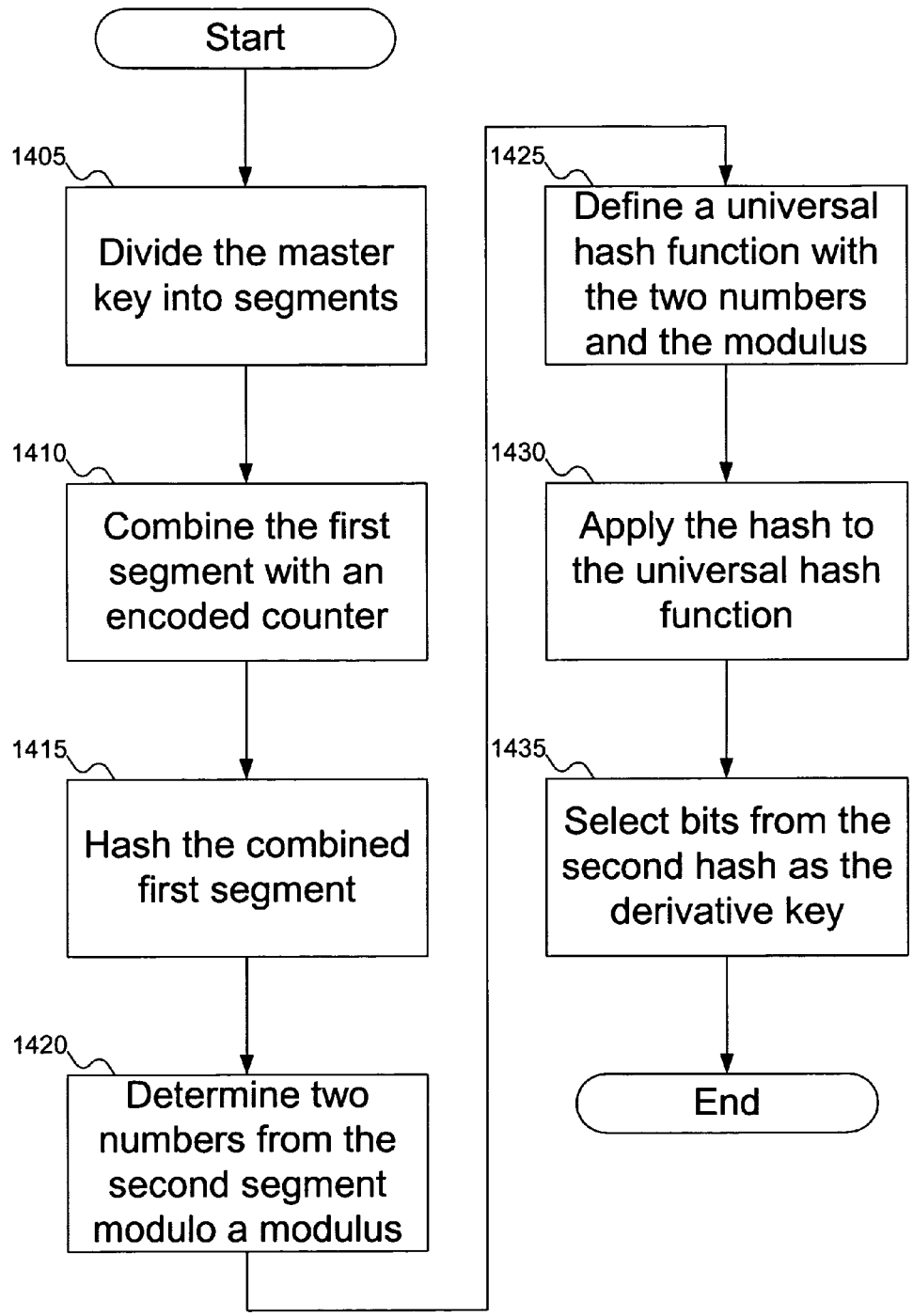
FIG. 14 shows a flowchart for using the key derivation function of FIG. 12, according to an embodiment of the invention.

Now that the apparatuses of FIGS. 12 and 13 have been presented, the methods of their use can be understood. FIG. 14 shows a flowchart for using the key derivation function of FIG. 12, according to an embodiment of the invention. At block 1405, the master key is divided into segments. At block 1410, the first segment is combined with an encoded counter. As described above with reference to FIG. 12, this combination can be the concatenation of the first segment with the encoded counter. At block 1415, the combined first segment is hashed.

At block 1420, two numbers are determined from the second segment. As discussed above with reference to FIG. 12, these two numbers can be determined relative to a modulus. At block 1425, a universal hash function is defined using the two determined numbers and the modulus. At block 1430, the result of the hash is applied to the universal hash function. At block 1435, bits are selected from the result of the universal hash as the derivative key.

Figure 15:
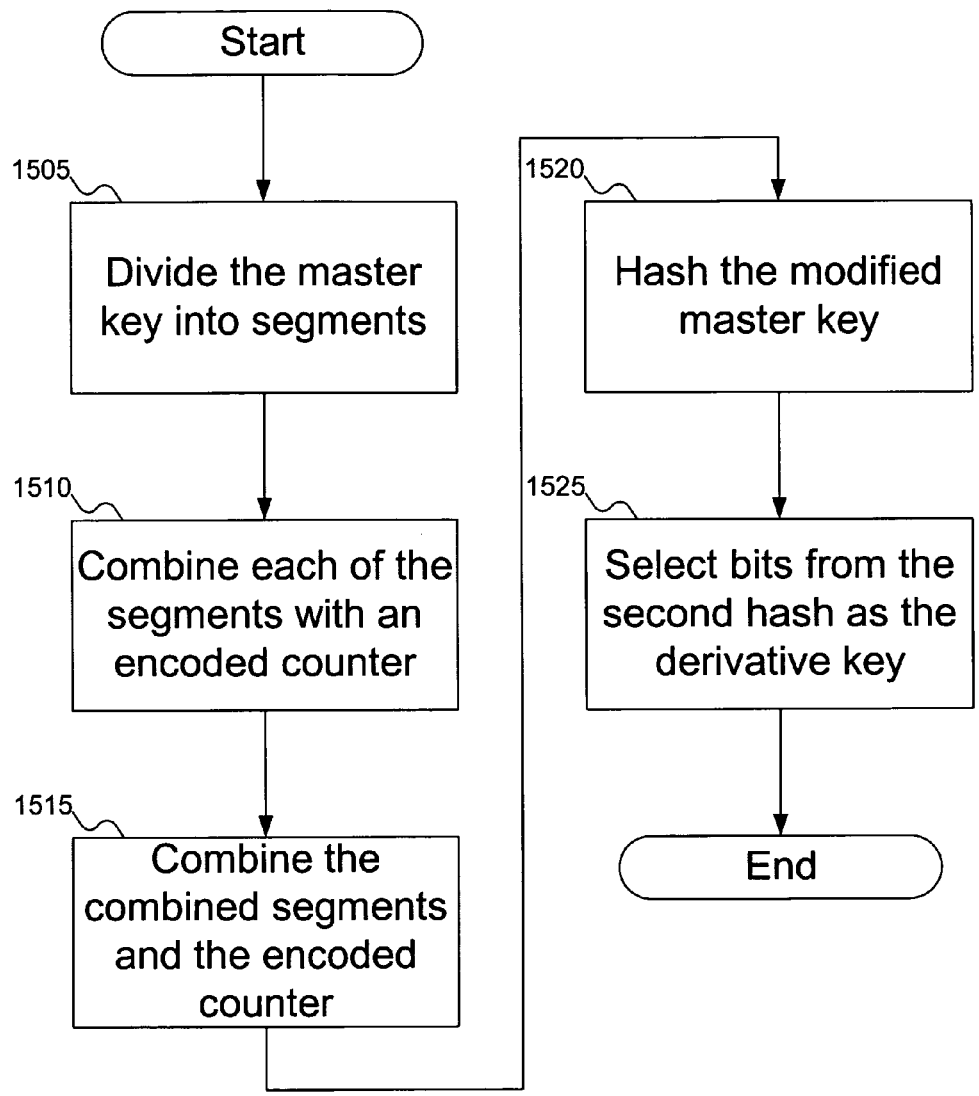
FIG. 15 shows a flowchart for using the key derivation function of FIG. 13, according to an embodiment of the invention.

FIG. 15 shows a flowchart for using the key derivation function of FIG. 13, according to an embodiment of the invention. At block 1505, the master key is divided into segments. At block 1510, each of the segments is combined with an encoded counter. As described above with reference to FIG. 13, this can be done by applying an XOR bit function to each of the segments individually with the encoded counter. At block 1515, the combined blocks are then recombined, and (as discussed above with reference to FIG. 13), can also be combined again with the encoded counter. At block 1520, this modified master key is then hashed, and at block 1525, bits are selected from the result of the hash as the derivative key.

Figure 16:
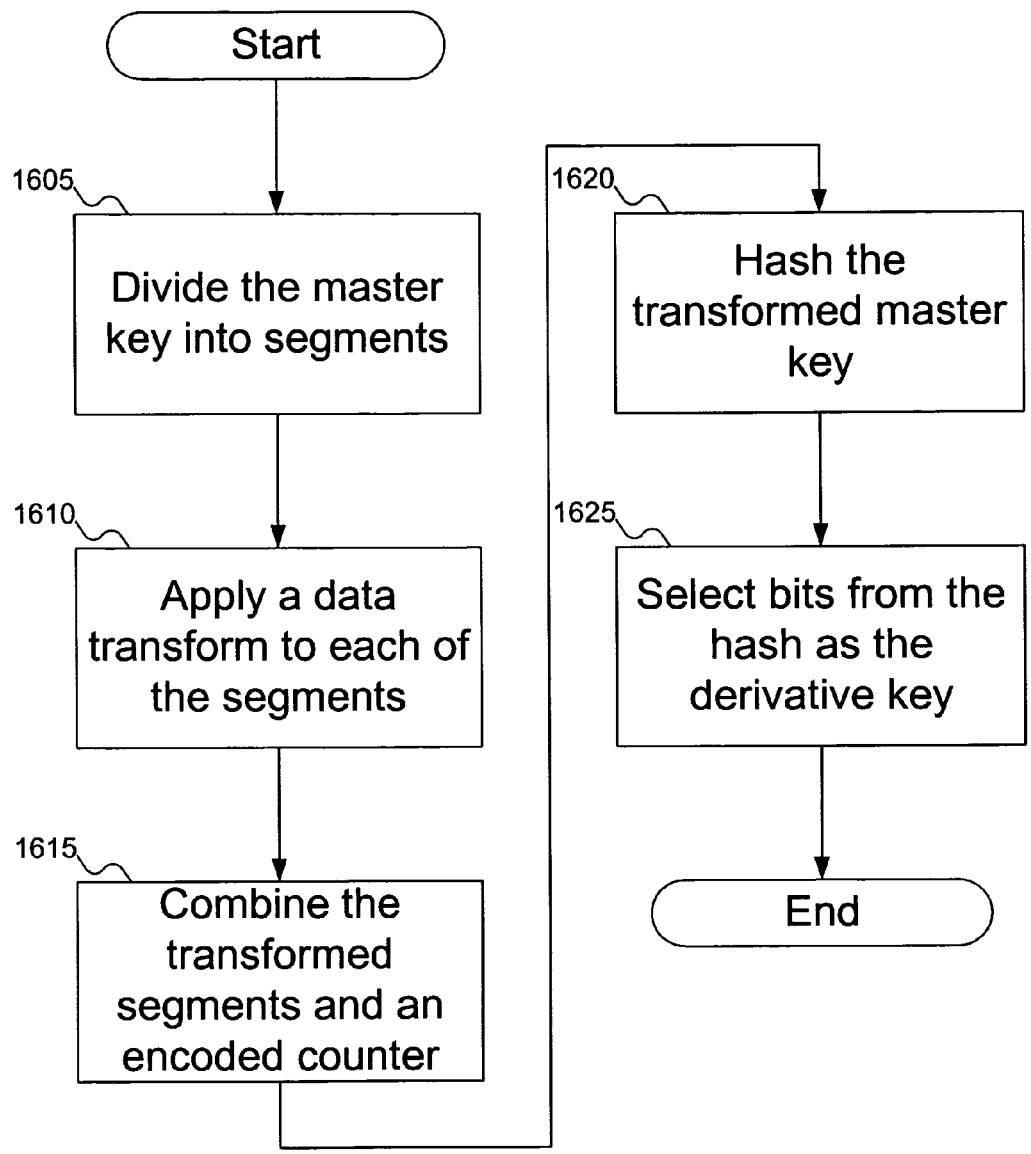
FIG. 16 shows a flowchart for using a key derivation function in the data security device of FIG. 5, according to an embodiment of the invention.

The key derivation functions shown in FIGS. 12-15 are only two examples. Other key derivation functions can also be used that combine the advantages of a secure hash algorithm and a universal hash algorithm. FIG. 16 shows a flowchart for yet another key derivation function in the data security device of FIG. 5, according to an embodiment of the invention. At block 1605, the master key is divided into segments. At block 1610, the segments are transformed using data transformation. Because the segments will typically be larger than the data transformer can use, only a subset of the segments are used: e.g., only the first bytes needed by the data transformation. At block 1615, the transformed segments are combined, and combined with encoded counter: e.g., the segments and the encoded counter can be concatenated together. At block 1620, the result is hashed, and at block 1625, bits are selected from the result of the hash as the derivative key.

While the apparatuses of FIGS. 12-13, and the flowcharts of FIGS. 14-16 show the generation of a single derivative key from a master key, it is worth noting that embodiments of the invention can easily be adapted to generate repeated derivative keys. These additional derivative keys can be generated in numerous ways. For example, the flowcharts of FIGS. 1416 all include counters. For each additional derivative key desired, the counter can be incremented. Thus, to derive the first key, the counter can use the value 1, to derive the second key, the counter can use the value 2, and so on.

In another variation, rather than using bit selector 1240 of FIG. 12 or bit selector 1335 of FIG. 13 to select bits for the derivative key, enough results can be generated at one time to select bits from the combined results for all the derivative keys. For example, assume that u keys are desired, each k bits long, and further assume that the results of the apparatuses of FIGS. 12-13 and/or the flowcharts of FIGS. 14-16 produce l bits before bit selection. If the key derivation function is applied m times, so that $m*l \geq u*k$, then the u derivative keys can all be selected at the same time from the $m*l$ resulting bits. For example, the $m*l$ resulting bits might all be concatenated together; the first key might then be selected as the first k bits, the second key might be selected as the second k bits, and so on until all u keys have been selected.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And, though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus comprising:
an input port to receive a master key;
an implementation of a universal hash algorithm, including:
a divider to divide said master key into a first segment and a second segment;
a repeater to repeat said counter to form an encoded counter as a longer bit pattern;
an implementation of a first bitwise binary function operative on said first segment and said encoded counter to produce a first result;
an implementation of a second bitwise binary function operative on said second segment and said encoded counter to produce a second result; and
a combiner to combine said first result, said second result, and said encoded counter to produce said result;
an implementation of a secure hash algorithm;
means for generating a derivative key from said master key using the implementation of said universal hash algorithm and said secure hash algorithm; and
an output port to output said derivative key.

2. An apparatus according to claim 1, wherein:
the implementation of said secure hash algorithm includes:
a combiner to combine said first segment with said counter to produce a modified first segment; and
means for using the implementation of said secure hash algorithm to hash said modified first segment into a hash value; and
the implementation of said universal hash algorithm includes:
a determiner to determine a first number and a second number from said second segment;
a calculator including an implementation of an arithmetic formula to compute a result using said hash value, said first number, and said second number; and
a bit selector to select a set of bits from said result as a derivative key.

3. An apparatus according to claim 1 wherein the means for generating includes:
means for using the implementation of said universal hash algorithm with said master key to produce a result; and
means for using the implementation of said secure hash algorithm with said result and a counter to produce said derivative key.

4. An apparatus according to claim 1, wherein the means for generating includes:
means for using the implementation of said secure hash algorithm with said master key and a counter to produce a result; and
means for using the implementation of said universal hash algorithm with said result to produce said derivative key.

5. An apparatus according to claim 4, wherein:
the apparatus further comprises a divider to divide said master key into a first segment and a second segment;
the means for using the implementation of said secure hash algorithm includes:
a combiner to combine said first segment with said counter to produce a modified first segment; and
means for using the implementation of said secure hash algorithm to hash said modified first segment into a hash value; and
the means for using the implementation of said universal hash algorithm includes:
a determiner to determine a first number and a second number from said second segment;
a calculator including an implementation of an arithmetic formula to compute
a result using said hash value, said first number, and said second number; and
a bit selector to select a set of bits from said result as a derivative key.

6. An apparatus comprising:
an input port to receive a master key;
a first calculator to implement a universal hash algorithm;
a second calculator to implement a secure hash algorithm;
a key denver to generate a derivative key from said master key using the first calculator and the second calculator, including:
a divider to divide said master key into a first segment and a second segment:
a repeater to repeat said counter to form an encoded counter as a longer bit pattern:
a third calculator to implement a first bitwise binary function operative on said first segment and said encoded counter to produce a first result;
a fourth calculator to implement a second bitwise binary function operative on said second segment and said encoded counter to produce a second result; and
a combiner to combine said first result, said second result, and said encoded counter to produce said result; and
an output port to output said derivative key.

7. An apparatus according to claim 6, wherein:
the second calculator includes:
a combiner to combine said first segment with said counter to produce a modified first segment; and a fifth calculator to implement said secure hash algorithm to hash said modified first segment into a hash value; and
the first calculator includes:
a determiner to determine a first number and a second number from said second segment;
a sixth calculator to implement an arithmetic formula to compute a result using said hash value, said first number, and said second number; and
a bit selector to select a set of bits from said result as a derivative key.

8. An apparatus according to claim 6, wherein the key denver includes:
the first calculator is operative to implement said universal hash algorithm with said master key to produce a result; and
the second calculator is operative to implement said secure hash algorithm with said result and a counter to produce said derivative key.

9. An apparatus according to claim 8, wherein the first calculator includes
the third calculator,
the fourth calculator, and
the combiner.

10. An apparatus according to claim 6, wherein the key denver includes:
a fifth calculator implements said secure hash algorithm with said master key and a counter to produce a result; and
a sixth calculator implements said universal hash algorithm with said result to produce said derivative key.

11. An apparatus according to claim 10, wherein:
the fifth calculator includes:
a second combiner to combine said first segment with said counter to produce a modified first segment; and
the third calculator implements said secure hash algorithm to hash said modified first segment into a hash value; and
the fourth calculator includes:
a determiner to determine a first number and a second number from said second segment;
a fifth calculator including an implementation of an arithmetic formula to compute a result using said hash value, said first number, and said second number; and
a bit selector to select a set of bits from said result as a derivative key.

12. An apparatus, comprising:
an input port to receive a master key;
a divider to divide said master key into a first segment and a second segment;
a concatenates to concatenate said first segment and a counter to produce a modified first segment;
a hasher to hash said modified first segment into a hash value;
a determiner to determine a first number and a second number from said second segment;
a calculator including an implementation of an arithmetic formula to compute a result using said hash value, said first number, and said second number; and
a bit selector to select a set of bits from said result as a derivative key, said derivative key thereby calculated using a secure hash and a universal hash.

13. An apparatus according to claim 12, further comprising an output port to output said derivative key.

14. An apparatus according to claim 12, wherein the calculator includes:
an implementation of a first function to compute a product of said hash value and said first number;
an implementation of a second function to compute a sum of said product and said second number; and
an implementation of a third function to compute said result of said sum modulo a modulus.

15. An apparatus according to claim 14, wherein the determiner is operative to determine said first number and said second number modulo said modulus.

16. An apparatus according to claim 14, wherein the implementation of said third function includes an implementation of said third function to compute said result of said sum modulo a prime modulus.

17. An apparatus according to claim 12, wherein the bit selector is operative to select as said derivative key a set of least significant bits from said result.

18. A data security device, comprising:
a key denver, including:
an input port to receive a master key;
a divider to divide said master key into a first segment and a second segment;
a concatenator to concatenate said first segment and a counter to produce a modified first segment;
a hasher to hash said modified first segment into a hash value;
a determiner to determine a first number and a second number from said second segment modulo a modulus;
a calculator including an implementation of an arithmetic formula to compute a result using said hash value, said first number, and said second number; and
a bit selector to select a set of bits from said result as a derivative key; and
an encrypted to encrypt data using said derivative key, said derivative key thereby calculated using a secure hash and a universal hash.

19. A data security device according to claim 18, further comprising a data transformer.

20. A data security device according to claim 19, wherein the data transformer is operative to transform an original master key into said master key.

21. A data security device according to claim 19, wherein the data transformer is operative to transform said derivative key into a transformed derivative key.

22. A data security device according to claim 18, wherein the calculator includes:
an implementation of a first function to compute a product of said hash value and said first number;
an implementation of a second function to compute a sum of said product and said second number; and
an implementation of a third function to compute said result from said sum modulo said modulus.

23. A data security device according to claim 18, wherein the implementation of said third function includes an implementation of said third function to compute said result from said sum modulo a prime modulus.

24. A method for performing key derivation, comprising:
dividing a master key into a first segment and a second segment;
hashing the first segment to produce a hash value;
determining a first number and a second number from the second segment;
computing a universal hash function of the hash value, the first number, and the second number to produce a result; and
selecting a derivative key from bits in the result.

25. A method according to claim 24, wherein:
the method further comprises determining a counter; and
hashing the first segment includes combining the first segment and the counter.

26. A method according to claim 24, wherein determining a first number and a second number includes:
deriving a third number and a fourth number from the master key;
computing the first number as the third number modulo a modulus; and
computing the second number as the fourth number modulo the modulus.

27. A method according to claim 24 wherein computing a universal hash function includes:
computing a product of the first number and the hash value;
computing a sum of the product and the second number; and
computing the result as the sum modulo a modulus.

28. A method according to claim 27, wherein computing the result includes computing the result as the sum modulo a prime modulus.

29. A method according to claim 27, wherein selecting a derivative key includes selecting the derivative key from a set of least significant bits in the result.

30. A method for encrypting data using a derivative key, comprising:
generating the derivative key, including:
dividing the master key into a first segment and a second segment;
hashing the first segment to produce a hash value;
determining a first number and a second number from the second segment;
computing a product of the first number and the hash value;
computing a sum of the product and the second number;
computing a result as the sum modulo a modulus; and
selecting the derivative key from bits in the result; and
encrypting data using the derivative key, the derivative key thereby calculated using a secure hash and a universal hash.

31. A method according to claim 30, further comprising applying a data transformation to the master key before generating the derivative key.

32. A method according to claim 31, wherein applying a data transformation includes:
dividing the master key into a third segment and a fourth segment, each of the third
segment and the fourth segment including at least one bit;
organizing the bits in the fourth segment into a number of groups, the number of groups equal to a number of bits in the third segment; each group having a same number of bits;
associating each of the groups with a bit in the third segment;
applying a permutation function to at least one of the groups according to the associated bit in the third segment; and
constructing the transformed master key from the third segment and the permuted groups.

33. A method according to claim 31, wherein applying a data transformation includes:
dividing the master key into a third segment and a fourth segment, each of the third segment and the fourth segment including at least one bit;
computing a power as a function of the third segment, the power being relatively prime to a function of a second modulus;
computing a result of raising a function of the fourth segment to the power;
computing an exponential permutation as the result modulo the second modulus; and
constructing the transformed master key from the third segment and the computed exponential permutation.

34. A method according to claim 30, further comprising applying a data transformation to the derivative key.

35. A method according to claim 34, wherein applying a data transformation includes:
dividing the master key into a third segment and a fourth segment, each of the third segment and the fourth segment including at least one bit;
organizing the bits in the fourth segment into a number of groups, the number of groups equal to a number of bits in the third segment; each group having a same number of bits;
associating each of the groups with a bit in the third segment;
applying a permutation function to at least one of the groups according to the associated bit in the third segment; and
constructing the transformed master key from the third segment and the permuted groups.

36. A method according to claim 34, wherein applying a data transformation includes:
dividing the master key into a third segment and a fourth segment, each of the third segment and the fourth segment including at least one bit;
computing a power as a function of the third segment, the power being relatively prime to a function of a second modulus;
computing a result of raising a function of the fourth segment to the power;
computing an exponential permutation as the result modulo the second modulus; and
constructing the transformed master key from the third segment and the computed exponential permutation.

37. A method according to claim 30, further comprising encrypting the derivative key.

38. A method according to claim 36, further comprising transmitting the encrypted derivative key.

39. A method according to claim 30, further comprising transmitting the encrypted data.

40. A method according to claim 30, wherein:
the method further comprises determining a counter; and
hashing the first segment includes combining the first segment and the counter.

41. A method according to claim 30, wherein determining a first number and a second number includes:
deriving a third number and a fourth number from the second segment;
computing the first number as the third number modulo a modulus; and
computing the second number as the fourth number modulo the modulus.

42. A method according to claim 30, wherein selecting a derivative key includes selecting the derivative key from a set of least significant bits in the result.

43. An apparatus, comprising:
an input port to receive a master key;
a repeater to repeat a value to form an encoded value as a longer bit pattern;
a divider to divide said master key into a first segment and a second segment;
a combiner to combine said master key and a said encoded value to produce a modified master key, including;
an implementation of a first bitwise binary function operative on said first segment and said encoded value to produce a first result;

an implementation of a second bitwise binary function operative on said second segment and said encoded value to produce a second result; and a combiner to combine said first result and said second result to produce said modified master key;

a hasher to hash said modified master key into a hash value; and a bit selector to select a set of bits from said hash value as a derivative key, said derivative key thereby calculated using a secure hash and a universal hash.

44. An apparatus according to claim 43, wherein the combiner includes a concatenator to concatenate said first result and said second result to produce said modified master key.

45. An apparatus according to claim 43, wherein the bit selector is operative to select a set of least significant bits from said hash value as said derivative key.

46. An apparatus according to claim 43, wherein the combiner is operative to said master key and a counter to produce said modified master key.

47. A data security device, comprising:

a key denver, including:

an input port to receive a master key;

a divider to divide said master key into a first segment and a second segment;

a repeater to repeat a value to form an encoded value as a longer bit pattern;

an implementation of a first bitwise binary function operative on said first segment and said encoded value to produce a first result;

an implementation of a second bitwise binary function operative on said second segment and said encoded value to produce a second result;

a combiner to combine said first result, said second result, and said encoded value to produce said modified master key;

a hasher to hash said modified master key into a hash value; and a bit selector to select a set of bits from said result as a derivative key; and an encrypted to encrypt data using said derivative key, said derivative key thereby calculated using a secure hash and a universal hash.

48. A data security device according to claim 47, further comprising a data transformer.

49. A data security device according to claim 48, wherein the data transformer is operative to transform an original master key into said master key.

50. A data security device according to claim 48, wherein the data transformer is operative to transform said derivative key into a transformed derivative key.

51. A data security device according to claim 47, wherein the repeater is operative to repeat a counter to form said encoded value as a longer bit pattern.

52. A method for performing key derivation, comprising:

combining a master key with a value to produce a modified master key, including;

dividing the master key into a first segment and a second segment;

combining the first segment with the value to produce a first result;

combining the second segment with the value to produce a second result; and combining the first result and the second result to produce the modified master key;

hashing the modified master key to produce a hash value; and selecting a derivative key from bits in the hash value, the derivative key thereby calculated using a secure hash and a universal hash.

53. A method according to claim 52, further comprising repeating a bit pattern in the value to form a longer bit pattern.

54. A method according to claim 52, wherein combining a master key with a value includes computing a bitwise binary function using the master key and the value.

55. A method according to claim 52, wherein combining the first result and the second result includes concatenating the first result and the second result to produce the modified master key.

56. A method according to claim 52, wherein selecting a derivative key includes selecting the derivative key from a set of least significant bits from the hash value.

57. A method according to claim 52, wherein combining a master key with a value to produce a modified master key includes combining said master key with a counter to produce said modified master key.

58. A method for encrypting a derivative key, comprising:

dividing a master key into a first segment and a second segment, each of the first segment and the second segment including at least one bit;

organizing the bits in the second segment into a number of groups, the number of groups equal to a number of bits in the first segment: each group having a same number of bits;

associating each of the groups with a bit in the first segment;

applying a permutation function to at least one of the groups according to the associated bit in the first segment;

constructing a transformed master key from the first segment and the permuted groups:

combining a the transformed master key with a value to produce a modified master key;

hashing the modified master key to produce a hash value;

selecting a derivative key from bits in the hash value; and encrypting data using the derivative key, the derivative key thereby calculated using a secure hash and a universal hash.

59. A method according to claim 58, wherein applying a data transformation includes:

dividing the master key into a third segment and a fourth segment, each of the third segment and the fourth segment including at least one bit;

computing a power as a function of the third segment, the power being relatively prime to a function of a predefined modulus;

computing a result of raising a function of the fourth segment to the power;

computing an exponential permutation as the result modulo the predefined modulus; and constructing the transformed master key from the third segment and the computed exponential permutation.

60. A method according to claim 58, further comprising applying a data transformation to the derivative key.

61. A method according to claim 60, wherein applying a data transformation includes:

dividing the master key into a third segment and a fourth segment, each of the third segment and the fourth segment including at least one bit;

organizing the bits in the fourth segment into a number of groups, the number of groups equal to a number of bits in the third segment; each group having a same number of bits;

associating each of the groups with a bit in the third segment;

applying a permutation function to at least one of the groups according to the associated bit in the third segment; and constructing the transformed master key from the third segment and the permuted groups.

62. A method according to claim 60, wherein applying a data transformation includes:

dividing the master key into a third segment and a fourth segment, each of the third segment and the fourth segment including at least one bit;

computing a power as a function of the third segment, the power being relatively prime to a function of a predefined modulus;

computing a result of raising a function of the fourth segment to the power;

computing an exponential permutation as the result modulo the predefined modulus; and constructing the transformed master key from the third segment and the computed exponential permutation.

63. A method according to claim 58, further comprising encrypting the derivative key.

64. A method according to claim 63, further comprising transmitting the encrypted derivative key.

65. A method according to claim 58, further comprising transmitting the encrypted data.

66. A method according to claim 58, wherein combining a master key with a value includes:

dividing the master key into a first segment and a second segment;

combining the first segment with the value to produce a first result;

combining the second segment with the value to produce a second result; and combining the first result and the second result to produce the modified master key.

67. A method according to claim 66, wherein combining the first result and the second result includes concatenating the first result and the second result to produce the modified master key.

68. A method according to claim 58, wherein combining a master key with a value includes:

dividing the master key into a first segment and a second segment;

combining the first segment with the value to produce a first result; and combining the first result with the second segment to produce the modified master key.

69. A method according to claim 58, wherein combining a master key with a value to produce a modified master key includes combining said master key with a counter to produce a modified master key.

* * * * *

UNITED STATES PATENT AND TRADEMARK OFFICE
CERTIFICATE OF CORRECTION

PATENT NO. : 7,577,250 B2  Page 1 of 1
APPLICATION NO. : 10/918718
DATED : August 18, 2009
INVENTOR(S) : Ivan Bjerre Damgaard et al.

It is certified that error appears in the above-identified patent and that said Letters Patent is hereby corrected as shown below:

Column 14, line 48, the word "denver" should read -- deriver --;
Column 14, line 52, the word "segment:" should read -- segment; --;
Column 14, line 54, the word "pattern:" should read -- pattern; --;
Column 15, line 12, the word "denver" should read -- deriver --;
Column 15, line 25, the word "denver" should read -- deriver --;
Column 15, line 50, the word "concatenates" should read -- concatenator --;
Column 16, line 16, the word "denver" should read -- deriver --;
Column 16, line 31, the word "encrypted" should read -- encrypter --;
Column 17, line 9, the word "24" should read -- 24, --;
Column 18, line 38, the words "claim 36," should read -- claim 37, --;
Column 18, line 63, the words "and a" should read -- and --;
Column 18, line 64, the word "including;" should read -- including: --;
Column 19, line 21, the word "denver" should read -- deriver --;
Column 19, line 40, the word "encrypted" should read -- encrypter --;
Column 19, line 56, the word "including;" should read -- including: --;
Column 20, line 35, the word "groups:" should read -- groups; --;
Column 20, line 36, the words "combining a" should read -- combining --.

Signed and Sealed this

Tenth Day of November, 2009

David J. Kappos
*Director of the United States Patent and Trademark Office*